(12) United States Patent
Chang et al.

(10) Patent No.: US 12,705,502 B1
(45) Date of Patent: Aug. 11, 2026

(54) INTERACTIVE MULTIMEDIA AND METHODS FOR DESIGNING INTERACTIVE MULTIMEDIA BASED ON DECISION TREES GENERATED BY MACHINE LEARNING

(71) Applicants: Ya-Han Chang, Rochester, NY (US); Hsin-Yu Chang, Taipei City (TW)

(72) Inventors: Ya-Han Chang, Rochester, NY (US); Hsin-Yu Chang, Taipei City (TW)

( * ) Notice: Subject to any disclaimer, the term of this patent is extended or adjusted under 35 U.S.C. 154(b) by 0 days.

(21) Appl. No.: 19/322,711

(22) Filed: Sep. 9, 2025

Related U.S. Application Data

(60) Provisional application No. 63/780,162, filed on Mar. 28, 2025.

(51) Int. Cl.
*G06N 5/01* (2023.01)
*G06F 9/451* (2018.01)

(52) U.S. Cl.
CPC ............... *G06N 5/01* (2023.01); *G06F 9/451* (2018.02)

(58) Field of Classification Search
None
See application file for complete search history.

(56) References Cited

U.S. PATENT DOCUMENTS

2019/0358545 A1 11/2019 Aghdaie et al.
2019/0392729 A1 12/2019 Lee et al.
2020/0139233 A1 5/2020 Weston et al.

OTHER PUBLICATIONS

Mosa et al., A Smartphone-Based Decision Support Tool for Predicting Patients at Risk of Chemotherapy-Induced Nausea and Vomiting: Retrospective Study on App Development Using Decision Tree Induction; JMIR Mhealth Uhealth 2021 | vol. 9 | iss. 12 | e27024; Total pp. 15 (Year: 2021).*
Odesola et al., Smart-Sensing Chairs for Sitting Posture Detection, Classification and Monitoring: A Comprehensive Review; Preprints.org; doi: 10.20944/preprints202403.1695.v1; Mar. 2024 (Year: 2024).*
Gareth et al., An Introduction to Statistical Learning with Applications in R; © Springer Science+Business Media New York 2013 (Corrected at 8th printing 2017); Total pp. 434 (Year: 2013).*
International Search Report and Written Opinion mailed on Oct. 29, 2025 in International Patent Application No. PCT/US2025/043624, filed on Aug. 27, 2025.

* cited by examiner

*Primary Examiner* — Alan Chen
(74) *Attorney, Agent, or Firm* — Huan-Yi Lin

(57) ABSTRACT

An interactive multimedia with multiple levels and a method for designing the interactive multimedia are provided. The interactive multimedia includes: a first level program, providing at least one first level interactive activity to determine one of multiple lines for the user to proceed from a first level to a next level; and a second level program, providing at least one second level interactive activity to determine one of multiple lines for the user to proceed from the second level to a next level. The levels and the lines of the interactive multimedia are designed at least partially based on a decision tree generated by a machine learning technique with a source data including predictor variables indicating attributes of respondents and a target variable indicating related outcomes of the respondents.

33 Claims, 22 Drawing Sheets

710

Figure 8A:
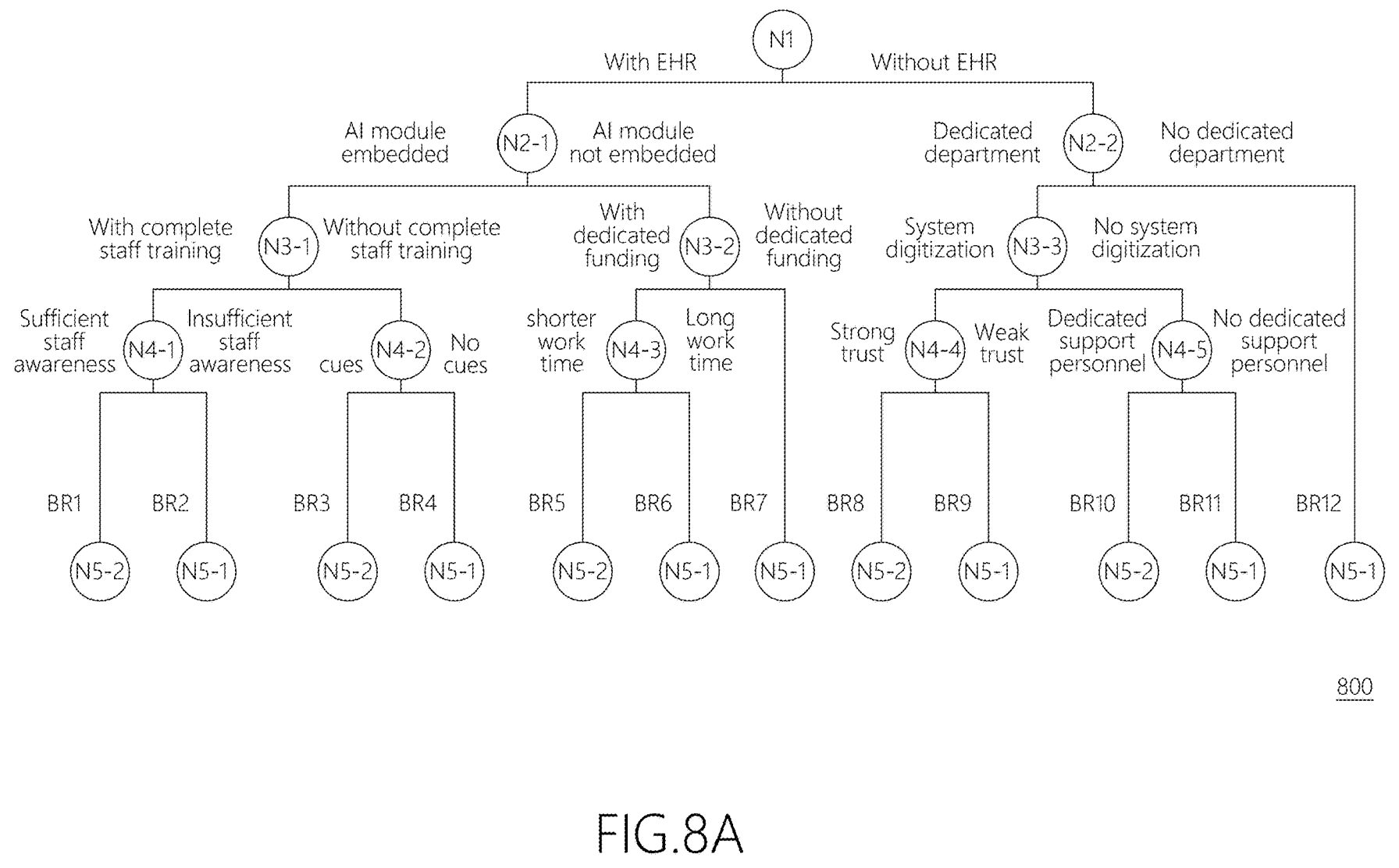

N1
With EHR
Without EHR
AI module embedded
N2-1
AI module not embedded
Dedicated department
N2-2
No dedicated department
With complete staff training
N3-1
Without complete staff training
With dedicated funding
N3-2
Without dedicated funding
System digitization
N3-3
No system digitization
Sufficient staff awareness
N4-1
Insufficient staff awareness
cues
N4-2
No cues
shorter work time
N4-3
Long work time
Strong trust
N4-4
Weak trust
Dedicated support personnel
N4-5
No dedicated support personnel
BR1
BR2
BR3
BR4
BR5
BR6
BR7
BR8
BR9
BR10
BR11
BR12
N5-2
N5-1
N5-2
N5-1
N5-2
N5-1
N5-1
N5-2
N5-1
N5-2
N5-1
N5-1
800

INTERACTIVE MULTIMEDIA AND METHODS FOR DESIGNING INTERACTIVE MULTIMEDIA BASED ON DECISION TREES GENERATED BY MACHINE LEARNING

CROSS-REFERENCE TO RELATED APPLICATION

This application claims the priority benefit of U.S. provisional applications Ser. No. 63/780,162 filed on Mar. 28, 2025. The entirety of the above-mentioned patent applications is hereby incorporated by reference herein and made a part of this specification.

BACKGROUND

Field of the Invention

The present disclosure relates to methods for designing interactive multimedia and the interactive multimedia designed according to the methods. In particular, some embodiments of the present disclosure relate to methods for designing interactive multimedia based on decision trees generated by machine learning and the interactive multimedia designed according to the methods.

Description of Related Art

Interactive multimedia refers to digital content that allows users to engage dynamically and interactively. Specifically, interactive multimedia may integrate multiple forms of media, such as text, audio, video, images, and animation, to create an immersive and interactive experience. Conventionally, interactive multimedia is designed based on predetermined setting(s) and simplified/hypothetical environment, thus fail to reflect complex interplay of various aspects in real world, nor the impact of complexity in real world on an individual's or an entity's decision making and its outcomes.

SUMMARY

In an aspect of the present disclosure, an interactive multimedia with multiple levels is provided. The interactive multimedia is implemented by a computer with at least one processor to execute computer program instructions to enable interactions with a user, and comprises: a first level program, providing at least one first level interactive activity to determine one of multiple lines for the user to proceed from a first level to a next level; and a second level program, providing at least one second level interactive activity to determine one of multiple lines for the user to proceed from the second level to a next level, wherein the levels and the lines of the interactive multimedia are designed based on a decision tree generated by a machine learning technique with a source data including predictor variables indicating attributes of respondents and a target variable indicating related outcomes of the respondents.

In some embodiments, the respondents are individuals in a sample population.

In some embodiments, the respondents are targeted entities.

In some embodiments, the lines correspond to branches of the decision tree, and the interactive activities correspond to nodes of the decision tree.

In some embodiments, one of the lines from each interactive activity is determined according to a splitting rule at the corresponding node of the decision tree.

In some embodiments, an (N-1)th level program of the interactive multimedia provides at least one (N-1)th level interactive activity to determine one of multiple lines for the user to proceed to an Nth level program, which provides Nth level interactive activities for presenting the outcomes.

In some embodiments, each of the Nth level interactive activities further provide analysis based on the decision tree for explaining cause of the one of the outcomes.

In some embodiments, at least one of the Nth level interactive activities further provides a plan for the user based on the decision tree, to guide the user for going through a different combination of the lines leading to another one of the outcomes.

In some embodiments, the plan provided by the at least one of the Nth level interactive activities comprises interactions with the user, and is adjustable according to reactions provided by the user.

In some embodiments, the interactive activities respectively comprise conducting a conversation with the user, and/or respectively comprise presenting an event to the user and sensing reaction of the user in response to the event.

In some embodiments, the interactive activities respectively comprise tracking static and/or dynamic postures of the user.

In some embodiments, the interactive activities respectively comprise tracking and/or recording interactions between the user and at least one another.

In an aspect of the present disclosure, a computer implemented method for designing an interactive multimedia is provided. The method comprises: generating a decision tree based on a source data by using a machine learning technique, wherein the decision tree has a hierarchical tree structure with multiple layers connected with one another by multiple branches, and the source data includes predictor variables indicating attributes of respondents and a target variable indicating related outcomes of the respondents; and generating user interface of the interactive multimedia, wherein the user interface has multiple levels corresponding to the multiple layers of the decision tree, and adjacent levels are connected via multiple lines corresponding to the multiple branches of the decision tree, respectively.

In some embodiments, the respondents are individuals in a sample population, or targeted entities.

In some embodiments, the layers of the decision tree respectively have at least one node from which at least two of the branches branch out, and each level of the user interface provides at least one interactive activity for a user based on the at least one node in one of the layers of the decision tree.

In some embodiments, the nodes of the decision tree include a root node and multiple internal nodes selected from the predictor variables in the source data.

In some embodiments, each interactive activity at one of the levels of the user interface is provided for acquiring an attribute of the user, which is corresponding to one of the predictor variables in the source data.

In some embodiments, a bottom layer of the decision tree has multiple ones of the node indicating the related outcomes of the respondents, and a bottom level of the user interface provides multiple ones of the interactive activity for presenting the related outcomes.

In some embodiments, the bottom level of the user interface further provides analysis based on the decision tree for explaining causes resulting the outcomes.

In some embodiments, the bottom level of the user interface further provides a plan to guide the user to another one of the outcomes.

In some embodiments, generating the decision tree comprises: running a decision tree algorithm based on the source data, to generate at least one decision tree; pruning the at least one decision tree by removing a predictor variable, wherein the step of running the decision tree algorithm and the step of pruning the at least one decision tree are recursively repeated until the generated at least one decision tree passes pre-determined criteria.

In some embodiments, the pruning is performed based on feature importance and/or variance of inflation factor (VIF) of the predictor variables.

In some embodiments, generating the decision tree further comprises performing a preliminary evaluation on the source data, based on feature importance and/or VIF.

In some embodiments, generating the decision tree further comprises cleaning the source data before performing the preliminary evaluation, wherein cleaning the source data comprises identifying missing data and replacing the missing data by mean or median if a percentage of the missing data with respect to sample size is less than a pre-determined percentage.

In an aspect of the present disclosure, an interactive multimedia with multiple levels is provided. The interactive multimedia is implemented by a computer with at least one processor to execute computer program instructions to enable interactions with a user, and comprises: a top level program, providing at least one top level interactive activity to determine a specific one of multiple lines for the user to proceed from a top level to a first internal level; and at least one internal level program, providing at least one internal level interactive activity for each internal level to determine one of multiple lines for the user to proceed from the first internal level directly or indirectly to a bottom level, wherein the top level interactive activity, the at least one internal level interactive activity and the bottom level interactive activity of the interactive multimedia are designed respectively based on a root node of a top layer, an internal node of a first internal layer, and a leaf node of a bottom layer of a decision tree generated by a machine learning technique with a source data including predictor variables indicating attributes of respondents and a target variable indicating related outcomes of the respondents.

In some embodiments, (1) the at least one internal level of the interactive multimedia has multiple internal levels including the first internal level and a last internal level, (2) at least one internal level interactive activity for each internal level determines one of multiple lines for the user to procced from the first internal level directly or indirectly to the last internal level, and (3) the last internal level interactive activity of the interactive multimedia is designed based on an internal node of the last internal layer of the decision tree.

In some embodiments, (1) the at least one internal level of the interactive multimedia has at least three internal levels including the first internal level, a second internal level, and a last internal level, (2) at least one internal level interactive activity for each internal level is provided to determine one of multiple lines for the user to procced from the first internal level to the second internal level and then directly or indirectly to the last internal level, and (3) the second internal level interactive activity and the last internal level interactive activity of the interactive multimedia are designed respectively based on an internal node of the second internal layer and an internal node of the last internal layer of the decision tree.

In an aspect of the present disclosure, a computer implemented method for designing an interactive multimedia is provided. The method comprises: generating a decision tree based on a source data by using a machine learning technique, wherein the decision tree has a hierarchical tree structure with multiple layers connected with one another by multiple branches, and the source data includes predictor variables indicating attributes of respondents and a target variable indicating related outcomes of the respondents; and generating user interface of the interactive multimedia, wherein the user interface has a top level, at least one internal level, and a bottom level, and provides at least one interactive activity at each level to determine one of multiple lines to proceed from a top level, to a first internal level, and directly or indirectly to a bottom level; wherein proceeding from the top level, to the first internal level, and directly or indirectly to the bottom level of the user interface corresponds to a path from a root node of a top layer, to a first internal node of a first internal layer, and directly or indirectly to a leaf node of a bottom layer of the decision tree, respectively.

In some embodiments, (1) the at least one internal level of the user interface has multiple internal levels including the first internal level and a last internal level, (2) the user interface provides at least one internal level interactive activity for each internal level to determine one of multiple lines to procced from the first internal level directly or indirectly to the last internal level, and (3) the last internal level of the user interface is designed based on an internal node of the last internal layer of the decision tree.

BRIEF DESCRIPTION OF THE DRAWINGS

FIG. 8A is a schematic diagram illustrating a decision tree, according to a fifth non-limiting example.

FIG. 8B is a schematic diagram illustrating an interactive multimedia designed based on the decision tree shown in FIG. 8A, according to the fifth non-limiting example.

FIG. 9D, FIG. 9E, FIG. 9F are schematic diagrams illustrating interactive multimedia as parts of a health care application, according to the sixth non-limiting example.

DETAILED DESCRIPTION OF EMBODIMENTS

Figure 1A:
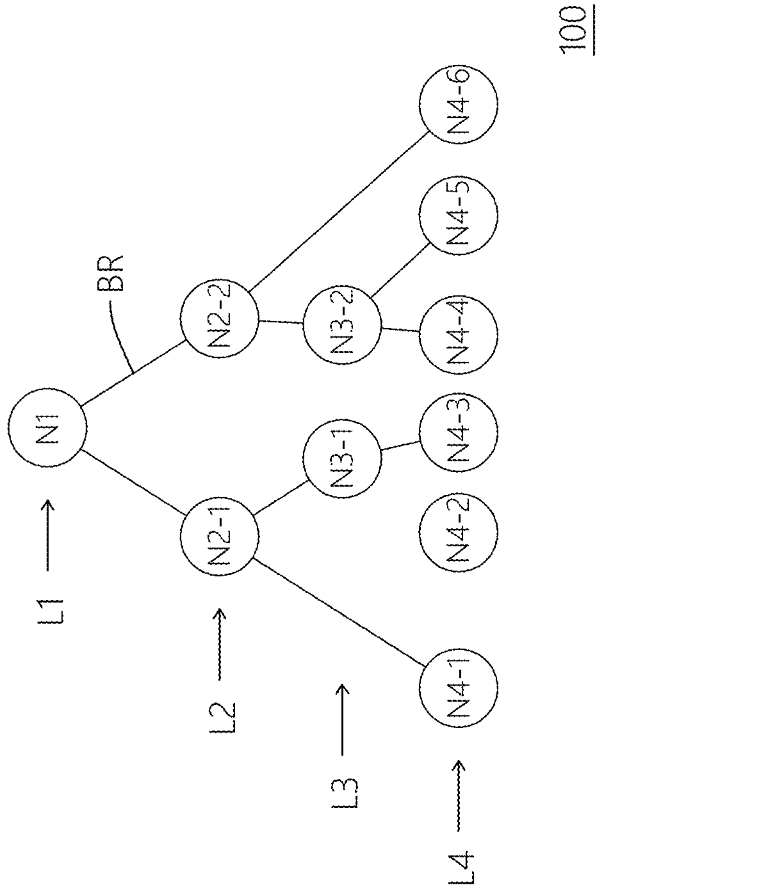
FIG. 1A is a schematic diagram illustrating a simplified decision tree, according to some embodiments of the present disclosure.

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

Particularly, the "user interface" used herein refers to various interactive mechanism and features, including many input and output channels/vehicles, through which users interact with a system. It encompasses all designed elements and interface mechanisms that facilitate bidirectional information exchange. User interface includes, but is not limited to, a variety of interaction forms: visual UI, which includes text menus, icons, buttons, sliders, animations, and 3D object interactions (such as picking up, placing, throwing, or breaking objects), etc.; non-visual UI, which incorporates voice input, auditory feedback, olfactory cues, haptic feedback (like vibrations), and brain-computer interfaces (BCI), utilizing attention-based inputs, etc.; screen-based UI, comprising the mouse, keyboard, touchscreen, and on-screen indicators etc.; non-screen-based UI, which features voice control, VR controllers, hand gesture recognition, motion tracking, spatial positioning, and environmental triggers (like lights activating upon entering a room) etc.; and implicit UI, referring to systems that operate without explicit interaction components, responding to users based on environmental or behavioral factors, such as gaze-based activation, blink-triggered actions, proximity detection, or changes in posture etc.

Various embodiments, or examples, for implementing different features of the present disclosure are provided. Specific examples of configurations are described below to simplify the present disclosure. These are, of course, merely examples and are not intended to be limiting.

The present disclosure provides a solution for designing an interactive multimedia uncovering complex patterns and interactions in real world, and presenting the impact of complexity in real world on an individual's or an entity's decision making and its outcomes, without requirement of assumptions.

According to various embodiments of the present disclosure, data-driven decision trees are generated by using machine learning technique, based on source data featuring complex interplay of various aspects in real world. Such decision trees allow exploration of if-then conditions through complex variables to predicted outcomes of individuals or entities, without any assumption. Depending on the source data, the decision tree may be a classification tree or a regression tree. Further, by option, each non-terminal node of the decision tree may be split into two or more sub-nodes.

An interactive multimedia is designed at least partially based on hierarchical tree structure of a decision tree. Specifically, the interactive multimedia includes multiple levels of user interface (or referred to as multiple levels of programs), each providing at least one interactive activity mapped to the node(s) in a corresponding layer of the decision tree. The interactive activity allows user to react in response to a certain event, situation, question, conversation or the like initiated by the interactive activity. User's reaction to an interactive activity at a level of user interface determines a line connecting to another interactive activity at a next level of user interface, and mapped to a corresponding branch in the decision tree. In this way, lines are established from a first level of user interface to a Nth level of user interface, in which interactive activities present the predicted outcomes to the user.

Since the decision tree is trained based on complex interplay in real world, the interactive multimedia designed based on the decision tree can provide highly reliable predictions for users. Therefore, in certain applications, the interactive multimedia can be used for performance diagnosis and/or analysis. In some embodiments, the interactive activities at the Nth level of user interface of the interactive multimedia further provide recommendations based on the decision tree, for guiding the users to better outcomes. In these embodiments, the interactive multimedia can be educational, therapeutic or assistive for improving certain performances.

FIG. 1A is a schematic diagram illustrating a simplified decision tree 100, according to some embodiments of the present disclosure.

As a simplified example, the decision tree 100 recursively partitions source data into subsets based on relationship between predictor variables and a target variable in the source data, and ultimately assigns each subset to a specific class. In this way, the decision tree 100 constructs if-then conditions for predicting an outcome of an individual or an entity. The source data may be a collection of surveys or questionaries that record attributes of respondents, which may be individuals in a sample population or targeted entities. Variables in the source data that indicate attributes for making predictions are also referred to as the predictor variables or independent variables, whereas a variable in the source data that indicates outcomes are also referred to as the target variable, a dependent variable or an outcome variable. The predictor variables and the target variable in the source data reflect complex interplay of various aspects in real world. For individuals, the predictor variables in the source data may indicate (but not limited to) individuals' socioeconomic status, sociodemographic status, health, habit, plan, and more. On the other hand, for entities such as organizations or companies, the predictor variables in the source data may indicate (but not limited to) entities' symbiotic relationship with society, inter-organizational relationship, capital, size, location, market position, internal conditions and more. The decision tree 100 is trained to capture non-linear relationship between the predictor variables and the target variable.

In the simplified example, the decision tree 100 with a hierarchical tree structure has four layers, including layers L1, L2, L3 and L4. Each layer of the decision tree 100 has one or more node(s). For instance, the first or top layer L1 has a single node N1, which is also referred to as a root node. In addition, the second layer L2, first internal layer, may have two internal nodes N2-1, N2-2, and the third layer L3, last internal layer, may have two internal nodes N3-1, N3-2 as well. Further, the fourth or bottom layer L4 may have six nodes N4-1, N4-2, N4-3, N4-4, N4-5 and N4-6, which may also be referred to as leaf nodes.

Each of non-terminal nodes (including the root node N1 and the internal nodes N2-1, N2-2, N3-1 and N3-2) represents a splitting rule based on one of the predictor variables, and branches BR split from each of the non-terminal nodes represent subgroups of the source data. By passing down the source data from the root node N1, the source data is repeatedly split according to the splitting rules of the root node N1 and the internal nodes N2-1, N2-2, N3-1 and N3-2, until the branches BR reach the leaf nodes N4-1, N4-2, N4-3, N4-4, N4-5 and N4-6. The branches BR respectively connected to one of the leaf nodes N4-1, N4-2, N4-3, N4-4, N4-5 and N4-6 represent subgroups of the source data that are rather homogeneous in terms of the target variable. In this way, the source data is classified based on the splitting rules, into homogeneous groups mapped to the leaf nodes N4-1, N4-2, N4-3, N4-4, N4-5 and N4-6 indicating the outcomes.

This provides visualization of how the predictor variables relate to the target variable. Particularly, complex and non-linear relationships between the predictor variables and the target variable can be captured by such a decision tree. Furthermore, according to various embodiments of the present disclosure, the splitting rules at the root node and the internal nodes are used for creating if-then interaction experiences in an interactive multimedia with a hierarchical tree structure at least partially mapped to the hierarchical tree structure of the decision tree.

Figure 1B:
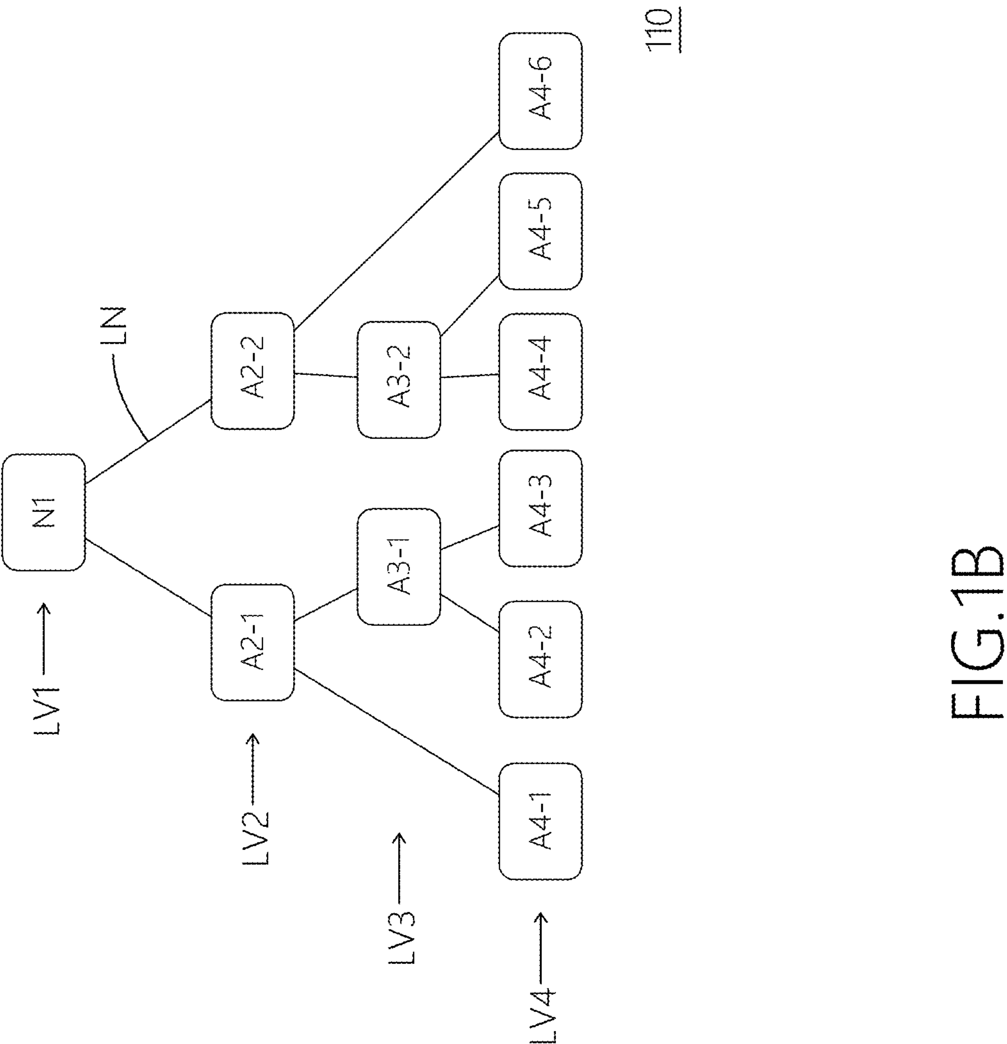
FIG. 1B is a schematic diagram illustrating an interactive multimedia designed based on the decision tree shown in FIG. 1A, according to some embodiments of the present disclosure.

FIG. 1B is a schematic diagram illustrating an interactive multimedia 110 designed based on the decision tree 100, according to some embodiments of the present disclosure.

With a hierarchical tree structure mapped to the hierarchical tree structure of the decision tree, the interactive multimedia 110 is designed with multiple levels. A first level program LV1 is mapped to the top layer L1 of the decision tree 100; a second level program LV2 is mapped to the second layer L2 of the decision tree 100; a third level program LV3 is mapped to the third layer L3 of the decision tree 100; and a fourth level program LV4 is mapped to the bottom layer L4 of the decision tree 100.

The first level program LV1 provides a first level interactive activity A1, which is designed based on the splitting rule of the root node N1 in the top layer L1 of the decision tree 100. Lines LN split from the first level interactive activity A1 are mapped to the branches BR split from the root node N1 of the decision tree 100, and lead to a next level. Specifically, the lines LN from the first level program LV1 lead to second level interactive activities A2-1, A2-2 in the second level program LV2, which are designed based on the splitting rules of the internal nodes N2-1, N2-2 in the second layer L2 of the decision tree 100, respectively. Depending on user's response to the first level activity A1, one of the lines LN is determined for the user to proceed to one of the second level interactive activities A2-1, A2-2 in the second level program LV2. Similarly, the hierarchical tree structure of the interactive multimedia 110 fans out from the second level program LV2 to the third level program LV3 and the fourth level program LV4.

Lines LN split from the second level interactive activity A2-1 are mapped to the branches BR split from the internal node N2-1 of the decision tree 100. One of the lines LN from the second level interactive activity A2-1 leads to a third level interactive activity A3-1 in the third level program LV3 designed based on the splitting rule of the internal node N3-1 in the third layer L3 of the decision tree 100. Meanwhile, the other line LN from the second level interactive activity A2-2 leads to a fourth level interactivity A4-1 in the fourth level program LV4 designed based on the outcome presented by the leaf node N4-1 in the bottom layer L4 of the decision tree 100. Depending on user's response to the second level interactive activity A2-1, one of the lines LN from the second level interactive activity A2-1 is determined for the user to proceed to an interactive activity in the next level, which could be the third level interactive activity A3-1 in the third level program LV3 or the fourth level interactive activity A4-1 in the fourth level program LV4.

Further, depending on user's response to the third level interactive activity A3-1, one of lines LN from the third level interactive activity A3-1 is determined for the user to proceed to an interactive activity in the next level, which could a fourth level interactive activity A4-2 or another fourth level interactive activity A4-3 in the fourth level program LV4. The fourth level interactive activity A4-2 is designed based on the outcome presented by the leaf node N4-2 in the bottom layer L4 of the decision tree 100. Likewise, the fourth level interactive activity A4-3 is designed based on the outcome presented by the leaf node N4-3 in the bottom layer L4 of the decision tree 100.

Depending on user's response to the second level interactive activity A2-2, one of lines LN from the second level interactive activity A2-2 is determined for the user to proceed to an interactive activity in the next level, which could be a third level interactive activity A3-2 in the third level program LV3 designed based on the splitting rule of the internal node N3-2 in the third layer L3 of the decision tree 100, or a fourth level interactive activity A4-6 in the fourth level program LV4 designed based on the outcome presented by the lead node N4-6 in the bottom layer L4 of the decision tree 100. In addition, depending on user's response to the third level interactive activity A3-2, one of lines LN from the third level interactive activity A3-2 is determined for the user to proceed to an interactive activity in the next level, which could a fourth level interactive activity A4-4 or a fourth level interactive activity A4-5 in the fourth level program LV4.

As described, each of the interactive activities in the first to third level programs LV1 to LV3 is designed based on the splitting rule of the corresponding node in the decision tree 100. These interactive activities may be each provided by presenting a certain event, a situation or a question designed based on the splitting rule of the corresponding node, to allow users to react or respond. Based on user's reaction or response, one of the split lines LN is determined for the user to proceed to the next level. Depending on types of the interactive multimedia 110, the lines LN connecting among the levels of programs in the interactive multimedia 110 may be decision paths leading to different predictions, or diverse story/plot lines representing branching narratives. It should be appreciated that the interactive activities and the lines are not limited to the examples provided above, but can be implemented by any suitable alternatives, according to specific design of the interactive multimedia.

In addition, the interactive activities A4-1 to A4-6 in the fourth level program LV4 designed based on the outcomes presented by the leaf nodes N4-1 to N4-6 of the decision tree 100 may be implemented by plenty of alternatives. In some embodiments, each of the interactive activities A4-1 to A4-6 provides an immersive experience to present the corresponding outcome, such as a life experience, an ending of a story line. The immersive experience may allow users to interact with, such as presenting the outcome by initiating a dialog with users, creating a space in which users can explore or the like. In some other embodiments, each of the interactive activities A4-1 to A4-6 provides a report or a commentary to present the corresponding outcome, such as a predicted category of possibility, performance or the like. In further embodiments, some or all of the interactive activities A4-1 to A4-6 also provide respective plans for users to improve their outcomes, based on the nodes and branches of the decision tree 100. According to these embodiments, the improvement plans may be provided with further interactions with users, and may be adjusted based on user's reaction as well as the nodes and branches of the decision tree 100. Therefore, the interactive multimedia can be educational, therapeutic, or used as a coaching/training tool.

It should be noted that the decision tree and the interactive multimedia are not limited to the simplified example described with reference to FIG. 1A and FIG. 1B. For example, the hierarchical tree structure of the decision tree and the interactive multimedia may vary in accordance with the source data. Specifically, decision trees according to other examples may have more or less than 4 layers, and/or include one or more nodes each divided/split into more than 2 next layer nodes.

Figure 2:
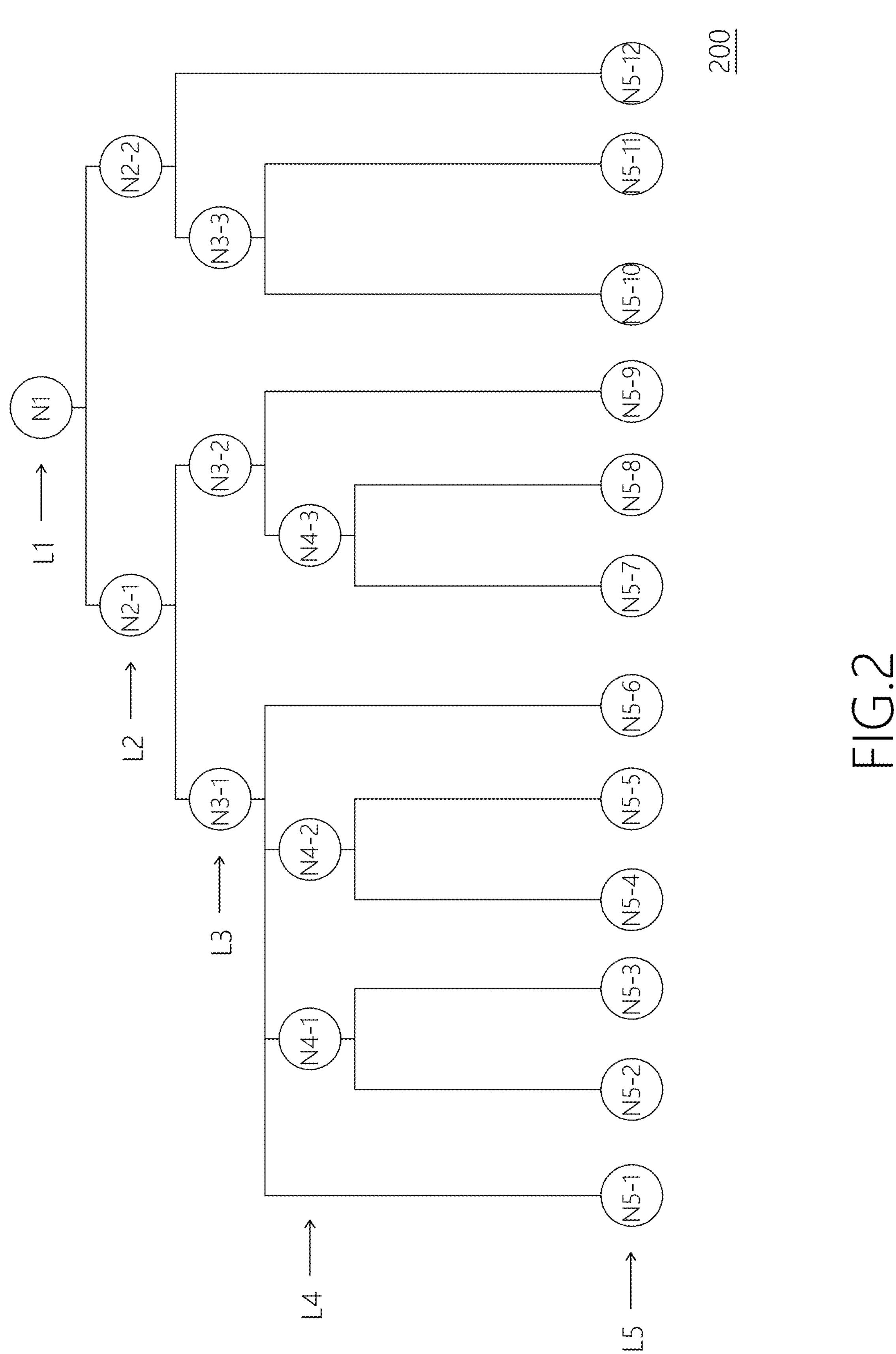
FIG. 2 illustrates a decision tree according some other embodiments.

For instance, FIG. 2 illustrates a decision tree 200 according to some other embodiments. As shown in FIG. 2, the decision tree 200 is generated with 5 layers L1 to L5. In addition, while a root node N1 and internal nodes N2-1, N2-2, N3-2, N3-3, N4-1, N4-2, N4-3 are respectively divided/split into two next layer nodes, an internal node N3-1 is divided/split into four next layer nodes, including the internal nodes N4-1, N4-2 and leaf nodes N5-1, N5-6. Other leaf nodes include leaf nodes N5-2 to N5-5 and N5-7 to N5-12.

Although not shown, an interactive multimedia designed based on the decision tree 200 may share the same hierarchical tree structure with the decision tree 200. That is, such interactive multimedia may have user interface with 5 levels, and one of third level interactive activities may lead to four interactive activities respectively at fourth level and fifth level.

User interface of interactive multimedia may be designed and generated completely or partially based on (corresponds to) hierarchical tree structures of the decision trees. Although the user interface (with hierarchical tree structure) of the interactive multimedia 110 in FIG. 1B is designed completely corresponding to the decision tree 100 in FIG. 1A, an interactive multimedia with partial correspondence to a decision tree in the horizontal direction or the vertical direction may be effective to provide certain educational and/or therapeutic function. Such interactive multimedia may also be assistive for improving certain performances when it is used as a coaching/training tool. Since the decision tree is trained based on complex interplay in real world, the interactive multimedia designed even only partially based on the decision tree can provide highly reliable predictions for users, and thus useful for performance diagnosis and/or analysis. The above decision tree is generated by a machine learning technique with a source data including predictor variables indicating attributes of respondents and a target variable indicating related outcomes of the respondents.

As an embodiment with partial correspondence in the horizontal direction, an interactive multimedia with multiple levels, for example 4 levels, may have a first level program LV1 and a second level program LV2 as shown in FIG. 1B corresponding to the root node N1 at the first layer and the internal nodes N2-1 and N2-2 at the second layer (first internal layer) of the decision tree as shown in FIG. 1A. As described above, the first level program LV1 provides a first level interactive activity A1 to determine one of two lines for the user to proceed to either one of the second level interactive activities A2-1 and A2-2 in the second level program LV2. Depending on user's response to second level interactive activity A2-1, one of the two lines is determined for the user to proceed to the next level interactive activity, either A4-1 at fourth level or A3-1 at third level. Similarly, depending on user's response to second level interactive activity A2-1, one of the two lines is determined for the user to proceed to the next level interactive activity, either A3-2 and A4-6. In this embodiment, first two levels of the user interface (or first two level programs) of interactive multimedia and the related lines correspond to first two layers of the decision tree and the related branches. Other level of the user interface of the interactive multimedia may vary from the corresponding layer of the decision tree. Another embodiment of an interactive multimedia with partial correspondence in the horizontal direction may have a second level program LV2 and a third level program LV3 as well as the related lines proceeding to next levels correspond to second level internal nodes N2-1 and N2-2 and third level internal nodes N3-1 and N3-2, as well as the related branches to next levels.

Similarly, after generating a decision tree based on a source data by using a machine learning technique, a computer implemented method for designing an interactive multimedia further includes a step for generating user interface of the interactive multimedia. The decision tree has a hierarchical tree structure with multiple layers connected with one another by multiple branches, and the source data includes predictor variables indicating attributes of respondents and a target variable indicating related outcomes of the respondents. The user interface has multiple levels corresponding to the multiple layers of the decision tree, and adjacent levels are connected via multiple lines corresponding to the multiple branches of the decision tree, respectively. As an embodiment with partial correspondence in the horizontal direction, the user interface generated by the computer implemented method has at least two levels corresponding to the at least two layers of the decision tree, such as first level and second level corresponding to the first layer and second layer of the decision tree. And first level and second level are connected via two lines as shown in FIG. 1B corresponds to the two branches from first layer to second layer of the decision tree as shown in FIG. 1A.

As an embodiment with partial correspondence in the vertical direction, an interactive multimedia with multiple levels, for example 4 levels, may have a first level program LV1 providing a first level interactive activity A1 and a second level program LV2 (first internal level program) providing at least a second level interactive activity A2-1 as shown in FIG. 1B corresponding to the root node N1 at the first layer and the internal nodes N2-1 at the second layer (first internal layer) of the decision tree as shown in FIG. 1A.

The decision tree is generated by a machine learning technique with a source data including predictor variables indicating attributes of respondents and a target variable indicating related outcomes of the respondents. As described above, the first level program LV1 provides a first level interactive activity A1 to determine one of two lines for the user to proceed to either one of the second level interactive activities A2-1 and A2-2 in the second level program LV2. Then, second level interactive activity A2-1 is provided to determine one of the two lines for the user to proceed to the next level interactive activity, either A4-1 at fourth level or A3-1 at third level. The first level interactive activity A1, the second level interactive activity A2-1, and the bottom level interactive activity A4-1 of the interactive multimedia as shown in FIG. 1B are designed and generated based on the root node N1 at first layer, the internal node N2-1 at second layer (first internal layer), and the leaf node N4-1 at bottom layer of the decision tree as shown in FIG. 1A. Other interactive activities of the interactive multimedia may vary from the corresponding nodes in the decision tree. Another embodiment of an interactive multimedia with partial correspondence in the vertical direction has the first level interactive activity A1 for the top level, the second level interactive activity A2-2 for the second level (first internal level), the third level interactive activity A3-1 for the third internal level (last internal level), and the bottom level interactive activity A4-2 for the bottom level of the interactive multimedia as shown in FIG. 1B designed and generated based on the root node N1 at first layer, the internal node N2-2 at second layer (first internal layer), the internal node N3-1 at the third layer (last internal layer) and the leaf node N4-2 at bottom layer of the decision tree as shown in FIG. 1A. Other interactive activities of the interactive multimedia may vary from the corresponding nodes of the decision tree.

Similarly, after generating a decision tree based on a source data by using a machine learning technique, a computer implemented method for designing an interactive multimedia further includes a step for generating user interface of the interactive multimedia. The decision tree has a hierarchical tree structure with multiple layers connected with one another by multiple branches, and the source data includes predictor variables indicating attributes of respondents and a target variable indicating related outcomes of the respondents. The user interface has a top level, at least one internal level such as a first internal level, and a bottom level, and provides at least one interactive activity at each level to determine one of multiple lines to proceed from the top level, to the first internal level, and directly or indirectly to the bottom level. As an embodiment with partial correspondence in the vertical direction, the user interface generated by the computer implemented method has a top level, at least one internal level such as first internal level, and a bottom level, and provides at least one interactive activity at each level to determine one of multiple lines to proceed from a top level, to a first internal level, and directly or indirectly to a bottom level. In addition, proceeding from the top level, to the first internal level, and directly or indirectly to the bottom level of the user interface corresponds to a path from a root node N1 of a top layer, to a first internal node of a first internal layer N2-1, and directly or indirectly to a leaf node of a bottom layer N4-1 of the decision tree, respectively. Other parts of the user interface of the interactive multimedia may be different from the corresponding nodes of the decision tree.

The concept of an interactive multimedia with partial correspondence to a decision tree in the horizontal direction or the vertical direction applies to all other embodiments described below without repeating similar descriptions.

Figure 3:
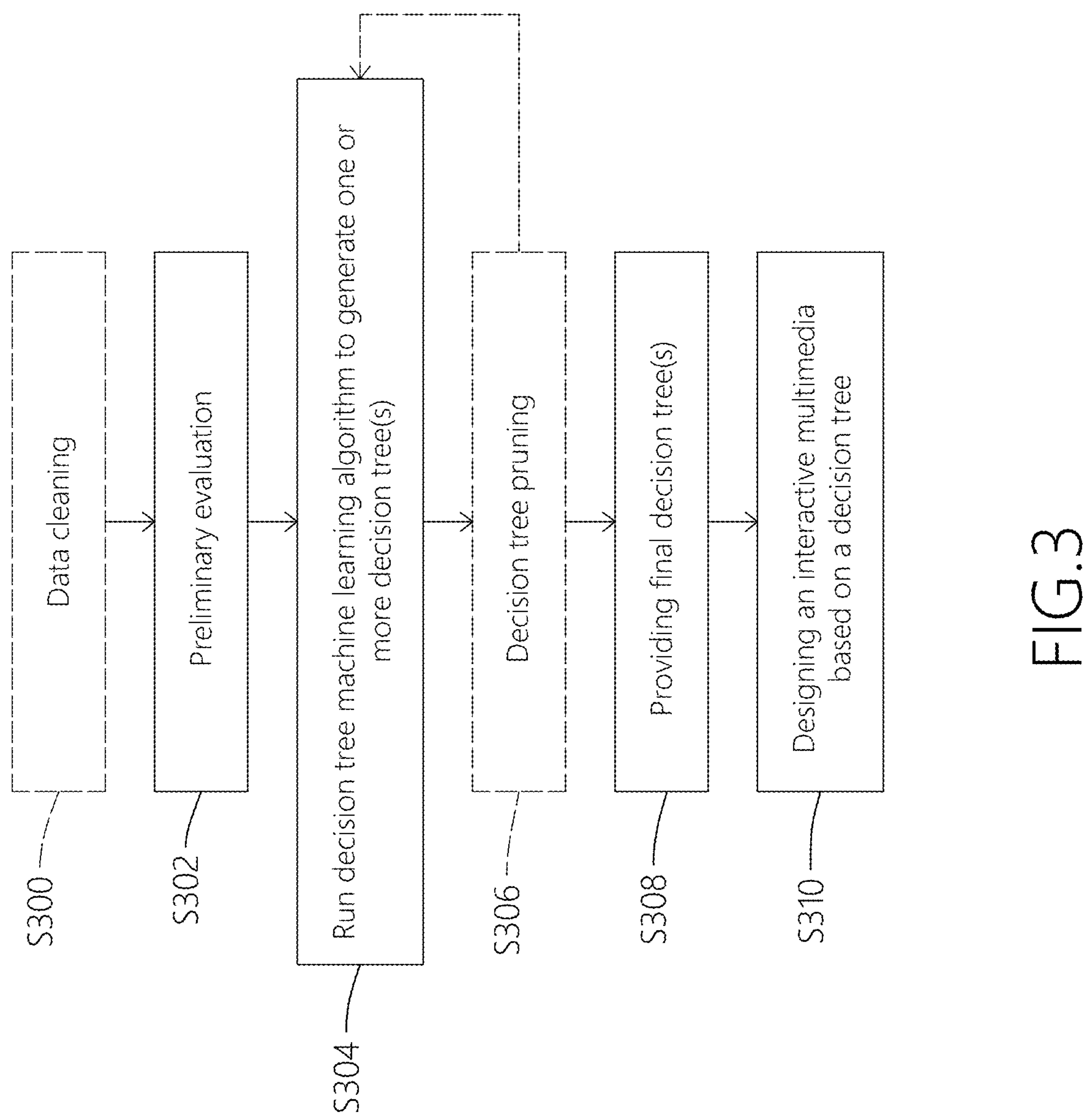
FIG. 3 is a flow diagram illustrating a method for designing an interactive multimedia, according to some embodiments of the present disclosure.

FIG. 3 is a flow diagram illustrating a method for designing an interactive multimedia, according to some embodiments of the present disclosure.

The method includes building a decision tree and designing the interactive multimedia at least partially based on the decision tree. Before decision tree generation, source data is collected according to a predefined objective, such as (but not limited to) impact of various conditions on life satisfaction of elderly people, academic performance of students in a certain age group, success rate of AI-assisted clinical implementation in medical institutions, individuals' health, students' learning outcome in classes or any other outcome of individuals or targeted entities. Surveys or questionnaires recording respondents' attributes and showing various variables related to the predefined objective may provide the source data. The respondents may be individuals in a sample population, or targeted entities, such as organizations or companies. According to some embodiments, the variables including the predictor variables and the target variable are recorded as numerical values respectively indicating a scale, an ordinal or a category. Further, the source data may be obtained from, for example, a database built by government, a research institution or any possible source.

At an optional step S300, data cleaning is performed. Missing data is a pervasive issue in statistical analysis that, if not properly addressed, can lead to biased results, reduced statistical power, and invalid conclusions. In certain cases that the source data has incomplete information owing to reasons such as nonresponses in surveys or data entry errors, the data cleaning operation may be performed. As an example, approaches for identifying missing data may include descriptive and frequency tests. According to some non-limiting embodiments, the identified error may be replaced by mean or median if percentage of missing data is less than about 15% of sample size. Nonetheless, unlike a regression approach, decision tree model is inherently robust to presence of data outliers, since the splitting rules are based on proportion of the source data, rather than absolute values. Therefore, in some embodiments, the data cleaning may not include removal of data outliers.

At a step S302, preliminary evaluation is performed on the source data. Specifically, before using the source data to generate one or more decision tree(s), the preliminary evaluation may provide an overview of the source data and a preview of the decision tree(s) generated based on the source data, including but not limited to model reliability and interpretability of the decision tree(s) to be generated. Evaluation of the model reliability and interpretability may include testing feature importance of the model to be generated. According to some embodiments, a model-based method is used for testing the feature importance. Specifically, the model-based method may include training a machine learning model and examining how the predictor variables influence predictions. As examples, the model-based method may include using a tree-based model such as a random forest (RF) model or a gradient boosting machine (GBM) model. In alternative embodiments, the feature importance is tested using a statistical method, which assesses relationship between the predicator variables and the target variable without explicitly building a model. Available approaches for the statistical method may include correlation analysis, chi-square test, analysis of variance and more.

Further, in certain cases, evaluation of the model reliability and interpretability may also include testing multicollinearity among the predictor variables. In contrast to linear regression models, a decision tree model does not require or assume a particular relationship between the predictor variables. Rather, a decision tree model selects splitting points based on relationship between each predictor variable and the target variable. Nonetheless, multicollincarity may sometimes lead to redundancy and overfitting, also reduction of predictive performance of a decision tree model, especially when sample size of the source data is very small. Therefore, for model interpretability purposes only (not a modeling requirement), testing multicollincarity may be involved in the preliminary evaluation. According to some non-limiting embodiments, variance inflation factor (VIF) is used to test multicollincarity.

At a step S304, a decision tree machine learning algorithm is used for generating one or more decision tree(s) based on the source data. As a dataset, the source data may be divided into a training dataset for generating a decision tree and a test dataset used for evaluating generalization of the decision tree. Based on pre-determined parameters and the training dataset, the algorithm may select the best predictor variable using attribute selection measure (ASM), to split the training dataset into smaller subsets. This process is repeated recursively, until a decision tree is formed. According to some non-limiting embodiments, the ASM includes analysis based on Gini index or information gain. By selecting the predictor variables through the attribute selection process, an amount of the predictor variables may be reduced. That is, only a portion of the predictor variables may be selected to form the decision tree. In this way, the decision tree model provides simplified proxy to represent the most relevant uncertainties in the forest of reality, and its simplification allows decision makers to communicate, comprehend, consider, and calculate options.

Further, the generated decision tree is subjected to accuracy evaluation. Specifically, the accuracy evaluation may include performing a receiver operating characteristic (ROC) analysis, which may involve obtaining an area under the curve (AUC) value. The AUC value indicates model performance for both the training dataset and the test dataset. According to some embodiments, it is determined that the decision tree has acceptable prediction performance if the AUC value for each of the training dataset and the test dataset is above 0.7, and a difference between the AUC value for the training data set and the AUC value for the test dataset is less than 0.15. In some embodiments, multiple combinations of the training dataset and the test dataset are divided from the source data. In these embodiments, multiple decision trees may be generated based on the training datasets of different size, and subjected to the accuracy evaluation.

It should be appreciated that more evaluation measures in addition to accuracy evaluation may be optionally applied to test the generated decision tree(s). For instance, the additional evaluation(s) may include (but not limited to) sensitivity test, specificity test, precision test, F1-score evaluation, kappa score evaluation and/or Menemar's test.

A step S306 is performed by option according to result of the accuracy evaluation and/or the additional evaluation(s), to prune the decision tree(s). For example, decision tree pruning may be performed if the AUC value for one or both of the training dataset and the test dataset does not reach a pre-determined threshold, and/or the difference between the AUC value for the training data set and the AUC value for the test dataset is over an acceptable value. Specifically, pruning the decision tree(s) may include removal of one of the predictor variables. To determine which of the predictor variables should be removed, the predictor variables may be ranked according to feature importance and/or VIF. In some embodiments, the lowest ranked predictor variable may be removed.

Returning to the step S304 with one of the predictor variables being removed, the decision tree algorithm is executed based on the target variable and the remaining predictor variables. Decision trees may fundamentally change due to small variations to source data. Therefore, new decision tree(s) may be generated after removal of one of the predictor variables. The new decision tree(s) may be reevaluated, and may be further subjected to pruning at the step S306 if the evaluation result does not pass pre-determined criteria. The steps S304, S306 may recursively repeat until the generated decision tree(s) pass the evaluation. At a step S308, the finalized decision tree(s) is/are provided.

At a step S310, the interactive multimedia is designed based on the finalized decision tree (or one of the finalized decision trees). As described with reference to FIG. 1A and FIG. 1B, the interactive multimedia is designed with a hierarchical tree structure mapped to a hierarchical tree structure of the decision tree. To avoid redundancy, details of the relationship between the decision tree and the interactive multimedia would not be repeated again.

Various tools may be used to implement the design of the interactive multimedia, and not by way of limitation. The design tools allow users to create engaging, dynamic content by combining various media elements such as text, image, audio, video, and animation. In addition, the design tools facilitate development of interactive experiences across diverse platforms including but not limited to websites, mobile applications, and digital displays. They are used in various fields, including entertainment, education, diagnosis, business and more. The present disclosure is not limited to specific design tools. Examples of the design tools may include (but not limited to): game design engines such as UNITY, UNREAL ENGINE, GODOT ENGINE and the like; visual editors/dynamic multimedia editors such as TOUCHDESIGNER and the like; and webpage 3D/interactive experience design tools such as THREE.JS, PLAYCANVAS and the like. In further embodiments, generative AI tools may be used for implementing or assisting the design of the interactive multimedia.

Figure 4:
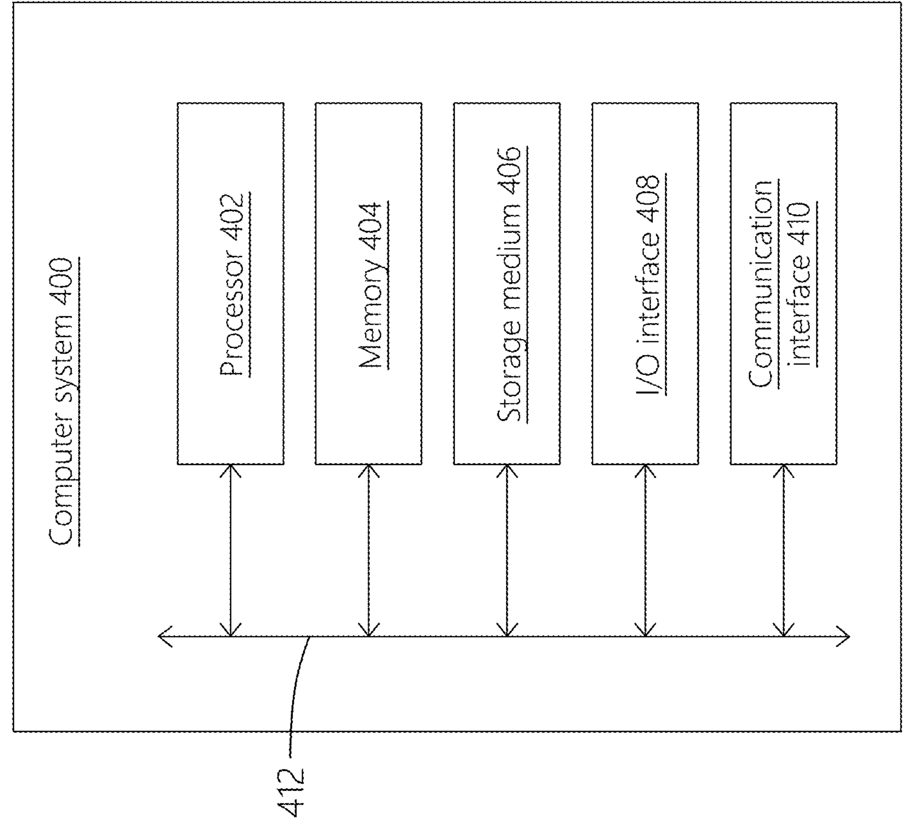
FIG. 4 is a block diagram schematically illustrating an example computer system, according to some embodiments of the present disclosure.

FIG. 4 is a block diagram schematically illustrating an example computer system 300, according to some embodiments of the present disclosure.

In particular embodiments, one or more of the computer systems 400 is/are configured to perform one or more of the steps the method for designing an interactive multimedia, as described with reference to FIG. 3. Further, in some embodiments, one or more of the computer systems 300 is/are configured to perform the method for designing the interactive multimedia, and to execute the interactive multimedia.

This disclosure contemplates the computer system 400 taking any suitable physical form. As example and not by way of limitation, computer system 400 may be an embedded computer system, a desktop computer system, a laptop computer system, a mainframe, a mesh of computer systems, a mobile telephone, a personal digital assistant (PDA), a server, a tablet computer system, a game console, a head-mounted display (HMD), a wearable or implantable computing device (such as smart glasses, contact lenses, or neural interface systems), a display system integrated with onboard computation (e.g., a holographic or volumetric display system with onboard computation), a gesture-controlled optical interface integrated with onboard computation, a brain-computer interface (BCI) integrated with onboard computation, or a combination of two or more of these.

In particular embodiments, computer system 400 includes a processor 402, a memory 404, a storage medium 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In some embodiments, the processor 402 includes hardware for executing program instructions, such as those making up a computer program. As an example and not by way of limitation, to execute instructions, the processor 402 may retrieve (or fetch) the instructions from an internal register, an internal cache, the memory 404, or the storage medium 406; decode and execute them; and then write one or more results to the internal register, the internal cache, the memory 404, or the storage medium 406. In particular embodiments, the processor 402 may include one or more internal caches for data, instructions, or addresses. In addition, according to some embodiments, the processor 402 may include one or more internal registers for data, instructions, or addresses. This disclosure contemplates the processor 402 including any suitable number of any suitable internal registers, where appropriate. Further, where appropriate, the processor 402 may include one or more arithmetic logic units (ALUs).

In some embodiments, the memory 404 includes main memory for storing instructions for the processor 402 to execute or data for the processor 402 to operate on. As an example and not by way of limitation, the computer system 400 may load instructions from the storage medium 406 or another source (such as, for example, another computer system 400) to the memory 404. The processor 402 may then load the instructions from the memory 404 to an internal register or internal cache. To execute the instructions, the processor 402 may retrieve the instructions from the internal register or internal cache and decode them. During or after execution of the instructions, the processor 402 may write one or more results to the internal register or internal cache. The processor 402 may then write one or more of those results to the memory 404.

One or more memory buses may couple the processor 402 to the memory 404. In particular embodiments, one or more memory management units (MMUs) reside between the processor 402 and the memory 404 and facilitate accesses to the memory 404 requested by the processor 402. In particular embodiments, the memory 404 includes random access memory (RAM), which may be volatile memory. Where appropriate, this RAM may be dynamic RAM (DRAM) or static RAM (SRAM). Moreover, where appropriate, this RAM may be single-ported or multi-ported RAM. This disclosure contemplates any suitable RAM.

In particular embodiments, the storage medium 406 includes mass storage for data or instructions. As an example and not by way of limitation, the storage medium 406 may include a hard disk drive (HDD), a floppy disk drive, flash memory, an optical disc, a magneto-optical disc, magnetic tape, or a Universal Serial Bus (USB) drive or a combination of two or more of these. The storage medium 406 may include removable or non-removable (or fixed) media, where appropriate. The storage medium 406 may be internal or external to the computer system 400, where appropriate. In particular embodiments, the storage medium 406 is non-volatile, solid-state memory. In particular embodiments, the storage medium 406 includes read-only memory (ROM). This disclosure contemplates the storage medium 406 taking any suitable physical form.

In particular embodiments, the I/O interface 408 includes hardware, software, or both, to provide one or more interfaces for communication between the computer system 400 and one or more I/O devices. The computer system 400 may include one or more of these I/O devices (not shown), where appropriate. One or more of these I/O devices may enable communication between a user and the computer system 400. As an example and not by way of limitation, an I/O device may include a keyboard, keypad, microphone, monitor, mouse, printer, scanner, speaker, still camera, stylus, tablet, display device, touch screen, trackball, video camera, sensor(s), another suitable I/O device or a combination of two or more of these. This disclosure contemplates any suitable I/O devices and any suitable I/O interfaces 408 for them. Where appropriate, the I/O interface 408 may include one or more device or software drivers enabling the processor 402 to drive one or more of these I/O devices.

In certain embodiments where the computer system 400 (or one of the computer systems 400) is configured to execute the interactive multimedia, one or more of its I/O device and I/O interface 408 are configured to provide user-computer interface for interactive experiences, such as (but not limited to) behavioral & biometric adaptation, brain-computer interface (BCI), multi-sensory immersion, smart adaptive environment and more. The behavioral & biometric adaption may involve adaptive A1 and emotion detection. The BCI may include electroencephalography (EEG) reading, neural feedback and direct neural interaction. The multi-sensory immersion may include providing various sensations, sensory stimulation and environmental & adaptive sensory feedback. Particularly, the sensory stimulations may include extended reality (XR), which covers virtual reality (VR), augmented reality (AR) and mixed reality (MR). In addition, the environmental & adaptive sensory feedback may involve thermal feedback, pressure feedback, airflow & humidity feedback and more. Further, the smart adaptive environment may include smart ambient interaction as well as IoT & smart device interaction, of which a wearable device may be provided as an I/O device for the computer system 300, or provided as the computer system 400 itself. As other options, the I/O device may be alternatively implemented by or include a holographic or volumetric display system, a gesture-controlled optical interface, any type of motion sensors (e.g., for detecting eye movement, hand gesture and interaction), a haptic feedback device (e.g., glove or vibrating controller) or so forth.

In particular embodiments, the communication interface 410 includes hardware, software, or both providing one or more interfaces for communication between the computer system 400 and one or more other computer systems 400 or one or more networks. As an example and not by way of limitation, the communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, the computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, the bus 412 includes hardware, software, or both coupling components of the computer system 400 to each other. As an example and not by way of limitation, the bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these.

The interactive multimedia and the method for designing the interactive multimedia as described above can be used in a wide variety of applications, such as (but not limited to) recreation, education and professional training, health and medical care, socialization learning, occupational and industrial applications, public policy and social development, modeling of engineering system, business model and marketing, environment simulation and sustainable development, immersive experience and cultural applications, modeling of biotechnology and neuroscience, national security applications and more. The application of recreation may include (but not limited to) interactive game, immersive storytelling, virtual experience, film and television, sports science and more. The application of health and medical care may include (but not limited to) disease prevention, clinical evaluation, rehabilitation, psychological study, emotional coping, neurobehavioral development, long-term care and more. The occupational and industrial applications may include (but not limited to) working scenario simulation, business administration, policy making, social development, talent cultivation, vocational skills training, performance evaluation and more. The application of public policy and social development may include (but not limited to) public policy simulation, urban planning, smart city, economic and social system modeling, diversity and inclusivity simulation, and more. The application of business model and marketing may include (but not limited to) ergonomics and human-computer interaction, traffic and logistics simulation, AI training and prediction, simulation of system optimization engineering and more. The application of business model and marketing may include (but not limited to) evaluation of new business model, consumer behavior simulation, market trend prediction, product testing and more. For illustration purpose, several non-limiting examples are provided hereinafter.

Figure 5A:
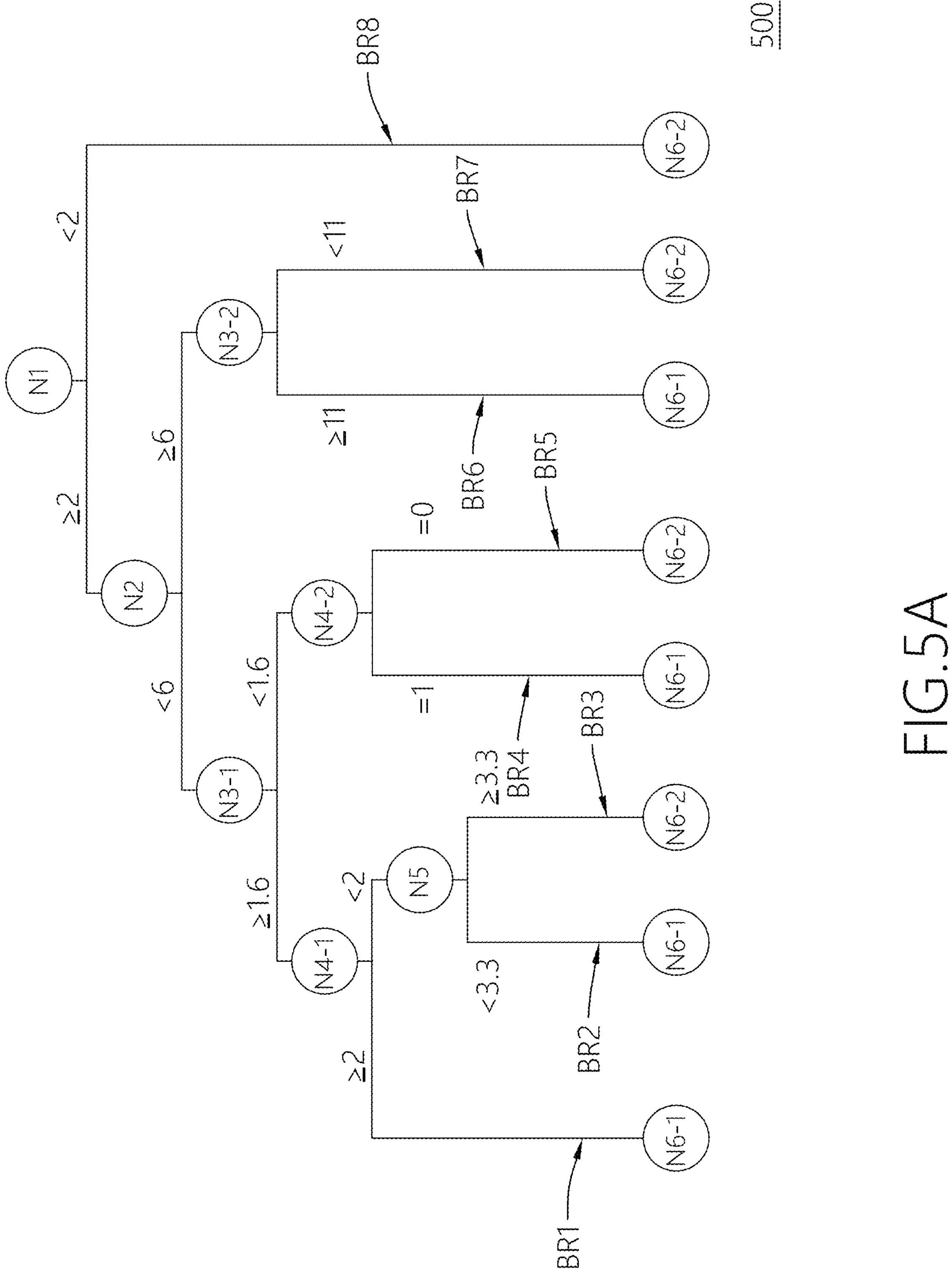
FIG. 5A is a schematic diagram illustrating a decision tree, according to a first non-limiting example.
Figure 5B:
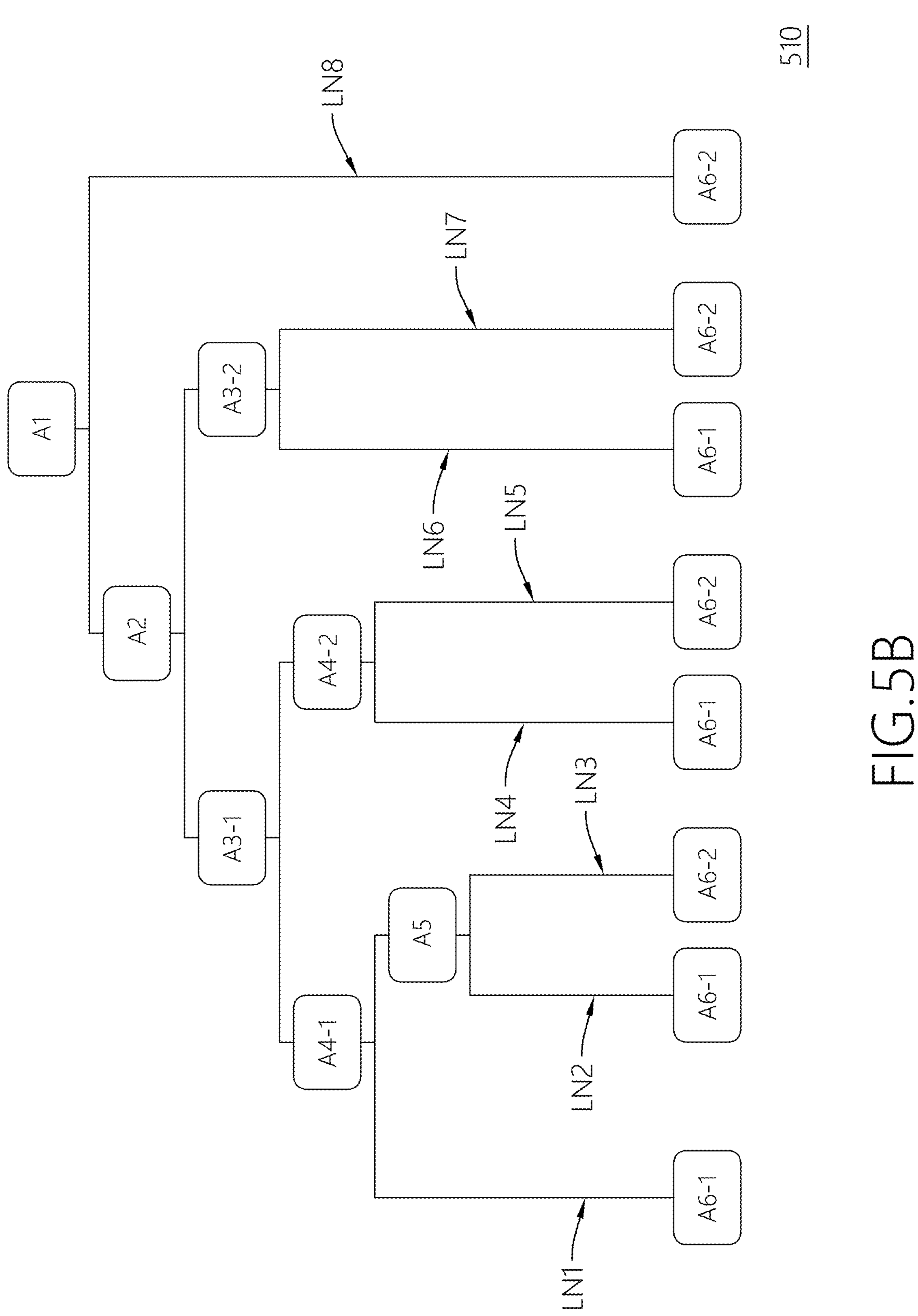
FIG. 5B is a schematic diagram illustrating an interactive multimedia designed based on the decision tree shown in FIG. 5A, according to the first non-limiting example.
Figure 5C:
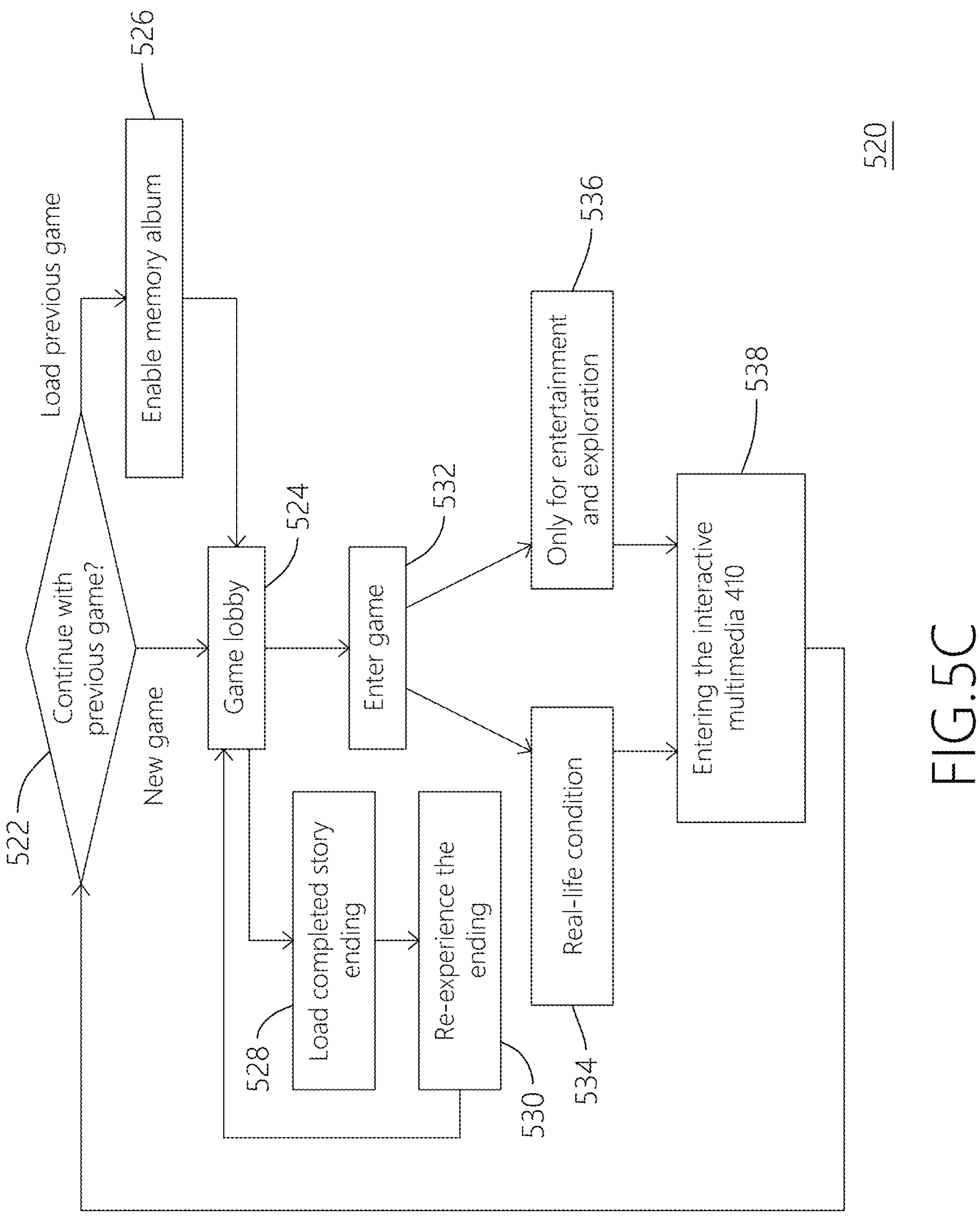
FIG. 5C is a flow diagram illustrating design of an interactive application including the interactive multimedia shown in FIG. 5B, according to the first non-limiting example.

FIG. 5A is a schematic diagram illustrating a decision tree 500, according to a first non-limiting example. FIG. 5B is a schematic diagram illustrating an interactive multimedia 510 designed based on the decision tree 500, according to the first non-limiting example. FIG. 5C is a flow diagram illustrating design of an interactive application 520 including the interactive multimedia 510, according to the first non-limiting example.

The decision tree 500 is generated based on source data designed for investigating relationship between respondents' attributes as predictor variables and their life satisfaction scales indicated by a target variable. By running attribute selection process, these predictor variables are ranked, and those with high importance are selected for a root node N1 and internal nodes N2, N3-1, N3-2, N4-1, N4-2, N5 of the decision tree 500. By passing down the source data, the source data is classified according to splitting rules at the root node N1 and the internal nodes N2, N3-1, N3-2, N4-1, N4-2, N5, into homogencous groups mapped to leaf nodes N6-1, N6-2 indicating different life satisfaction scales. Table 1 summarizes predictor variables corresponding to the root node N1 and the internal nodes N2, N3-1, N3-2, N4-1, N4-2, N5, as well as the splitting rules based on the predictor variables. It should be noted that, the "binary split" described hereinafter is contemplated to include mean point binary split or whole scale binary split.

TABLE 1

| Node | Predictor variable | Splitting rule |
|---|---|---|
| Root node N1 | Depression symptom severity | Binary split into a subgroup with scale no less than 2 (at least some depression symptom), and a subgroup with scale less than 2 (no or minimum symptom of depression) |
| Internal node N2 | How much preparation for the future | Binary split into a subgroup with scale less than 6 (few to some preparation), and a subgroup with scale no less than 6 (well or completely prepared) |
| Internal node N3-1 | How much belief in planning | Binary split into a subgroup with scale no less than 1.6 (at least some belief in planning), and a subgroup with scale less than 1.6 (minimum or no belief in planning) |
| Internal node N3-2 | Depression symptom severity | Binary split into a subgroup with scale no less than 11 (severe symptom), and a subgroup with scale less than 11 (mild to moderate symptom) |
| Internal node N4-1 | Dichotomized marital status | Binary split into a subgroup with category 1 (married and living with spouse), and a subgroup with category 2 (all other) |

TABLE 1-continued

| Node | Predictor variable | Splitting rule |
|---|---|---|
| Internal node N4-2 | Legal blindness | Binary split into a subgroup with category 1 (not legally blind) and a subgroup with category 2 (legally blind) |
| Internal node N5 | Level of acceptance for help | Binary split into a subgroup with a scale less than 3.3 (low to moderate acceptance), and a subgroup with a scale no less than 3.3 (high acceptance) |

As a result of the classification through the nodes, the source data is partitioned into subgroups respectively homogeneous in terms of life satisfaction scale. Specifically, subsets of the source data represented by branches BR1, BR2, BR4, BR6 show low life satisfaction, which is indicated by the leaf node N6-1. On the other hand, subsets of the source data represented by branches BR3, BR5, BR7, BR8 show high life satisfaction, which is indicated by the leaf node N6-2.

User interface of the interactive multimedia 510 shown in FIG. 5B is designed based on the decision tree 500. As shown in FIG. 5C, the interactive multimedia 510 is provided as a part of the interactive application 520, which may be categorized as a life simulation game. A first level interactive activity A1 at a first level of the user interface of the interactive multimedia 510 is designed based on the splitting rule of the root node N1 in the decision tree 500. Specifically, since start of the game, depression symptom severity of the player is evaluated at the first level interactive activity A1. For instance, the first level interactive activity A1 may initiate conversation with the player (e.g., through system text, voice output, graphical cues (e.g., in the form of illustrations or comics), one or more non-player character (s)), and assess melancholy level of the player by interpreting response provided by the player. Alternatively, the first level activity A1 may present one or more situation(s)/event (s)/object(s) by image(s) and/or video(s), and interpret reaction of the player in response to the event(s), to assess melancholy level of the player. It should be understood that, more options or combinations of different options may be otherwise applied to evaluate the depression symptom severity of the player. Based on the depression symptom severity of the player, a story line LN is determined for the player to proceed to the next level of the user interface. Specifically, for example, which of the two story lines LN split from the first level interactive activity A1 is determined by comparing a scale of the depression symptom severity of the player against the critical scale of depression symptom severity used for the splitting rule at the root node N1.

Similar approaches may be used for designing a second level interactive activity A2 at a second level of the user interface, third level interactive activities A3-1, A3-2 at a third level of the user interface, fourth level interactive activities A4-1, A4-2 at a fourth level of the user interface and a fifth level interactive activity A5 at a fifth level of the user interface. Specifically, the second level interactive activity A2 at the second level of the user interface of the interactive multimedia 510 is designed based on the splitting rule of the internal node N2 in the decision tree 500. The third level interactive activities A3-1, A3-2 at the third level of the user interface are designed based on the splitting rules of the internal nodes N3-1, N3-2 in the decision tree 500, respectively. The fourth level interactive activities A4-1, A4-2 at the fourth level of the user interface are designed based on the splitting rules of the internal nodes N4-1, N4-2 in the decision tree 500, respectively. In addition, the fifth level interactive activity A5 at the fifth level of the user interface of the interactive multimedia 510 is designed based on the splitting rule of the internal node N5 in the decision tree 500.

Story lines LN1, LN2, LN4, LN6 from the fourth level interactive activity A4-1, the fifth level interactive activity A5, the fourth level interactive activity A4-2 and the third level interactive activity A3-2 lead to sixth level interactive activities A6-1, which are designed based on the outcome indicated by the leaf nodes N6-1 (i.e., low life satisfaction). As an example (but not limited to), one of the sixth level interactive A6-1 provides a virtual environment in which the player can explore and interact with non-player character(s). Particularly, the virtual environment is designed to allow the player to experience negative feelings resulted from low life satisfaction. For instance, the virtual environment may be an indoor space, with depressing color scheme and/or melancholy background music. In addition, movement range/speed of the player in the virtual environment may be limited, and/or the non-player character(s) may be designed with features related to low life satisfaction. Also, pace of interaction (e.g., conversation) between the player and the non-player character(s) may be limited. As an option, all of the sixth level interactive activities A6-1 may be designed identically. Alternatively, some of the sixth level interactive activities A6-1 may be different from one another, as long as all of the sixth level interactive activities A6-1 are designed to present experience of low life satisfaction.

On the other hand, story lines LN3, LN5, LN7, LN8 from the fifth level interactive activity A5, the fourth level interactive activity A4-2, the third level interactive activity A3-2 and the first level interactive activity A1 lead to sixth level interactive activities A6-2, which are designed based on the outcome indicated by the lead nodes N6-2 (i.e., high life satisfaction). As an example (but not limited to), one of the sixth level interactive A6-2 provides a virtual environment in which the player can explore and interact with non-player character(s). Particularly, the virtual environment is designed to allow the player to experience positive feelings resulted from high life satisfaction. For instance, the virtual environment may be an outdoor space, with vivid color scheme and/or joyful or peaceful background music. In addition, the player is allowed to explore in the virtual environment with minimum or no limitation, and/or the non-player character(s) may be designed with features related to high life satisfaction. As an option, all of the sixth level interactive activities A6-2 may be designed identically. Alternatively, some of the sixth level interactive activities A6-2 may be different from one another, as long as all of the sixth level interactive activities A6-2 are designed to present experience of high life satisfaction.

As the decision tree 500 is trained based on complex interplay in real world, the interactive multimedia 510 designed based on the decision tree 500 can provide reliable predictions for players, without any assumption. Further, since players can experience their life satisfaction levels through interactive activities, such impressions may affect their future decision making. For instance, by having the negative impression of low life satisfaction, a player may be motivated to change his/her reactions to the interactive activities for the next time playing the interactive application 520, to seek improvement of life satisfaction experience. In this way, players may learn from the interactive multimedia 510, and begin making changes to their real lives. That is, the interactive multimedia 510 and the interactive application 520 including the interactive multimedia 510 can be therapeutic and/or educational.

An overview of the interactive application 520 according to the first non-limiting example is shown in FIG. 5C. Upon proceeding to a functional block 522, a player may be required to choose whether to load in previous game(s) (if any). In either case, the player may proceed to a functional block 524, and enter a game lobby. If the player decides to load in previous game(s), record(s) would be fetched (indicated by a functional block 526), and an option to access the previous game(s) is enabled at the game lobby. By selecting this option, the player can load completed story ending(s) (described by a functional block 528), and re-experience the completed story ending(s) (described by a functional block 530). On the other hand, if the player has not played the game before or decides to start a new game without loading previous record(s), the option for loading previous record(s) would not be enabled at the game lobby.

Upon entering the game from the game lobby (described by a functional block 532), the player may be required to choose if he/she would like to experience the interactive multimedia 510 with real-life conditions. If the player chooses to experience the interactive multimedia 510 with real-life conditions (described by a functional block 534), player data will be collected in background as new data for updating the decision tree 500 and the interactive multimedia 510. On the other hand, the player may choose to experience the interactive multimedia 510 without using his/her real-life conditions (described by a functional block 536). In either case, the player may proceed to a functional block 538, to start experiencing the interactive multimedia 510.

Based on a loop design (indicated by arrows from the functional block 538 back to the functional block 522), players can re-enter the interactive multimedia 510 one or more times. As described, players can learn from their previous experience, and are motivated to change their reactions for improvement of life satisfaction outcome. In this way, recreational learning can be provided by the interactive multimedia 510 and the interactive application 520 including the interactive multimedia 510.

Figure 6A:
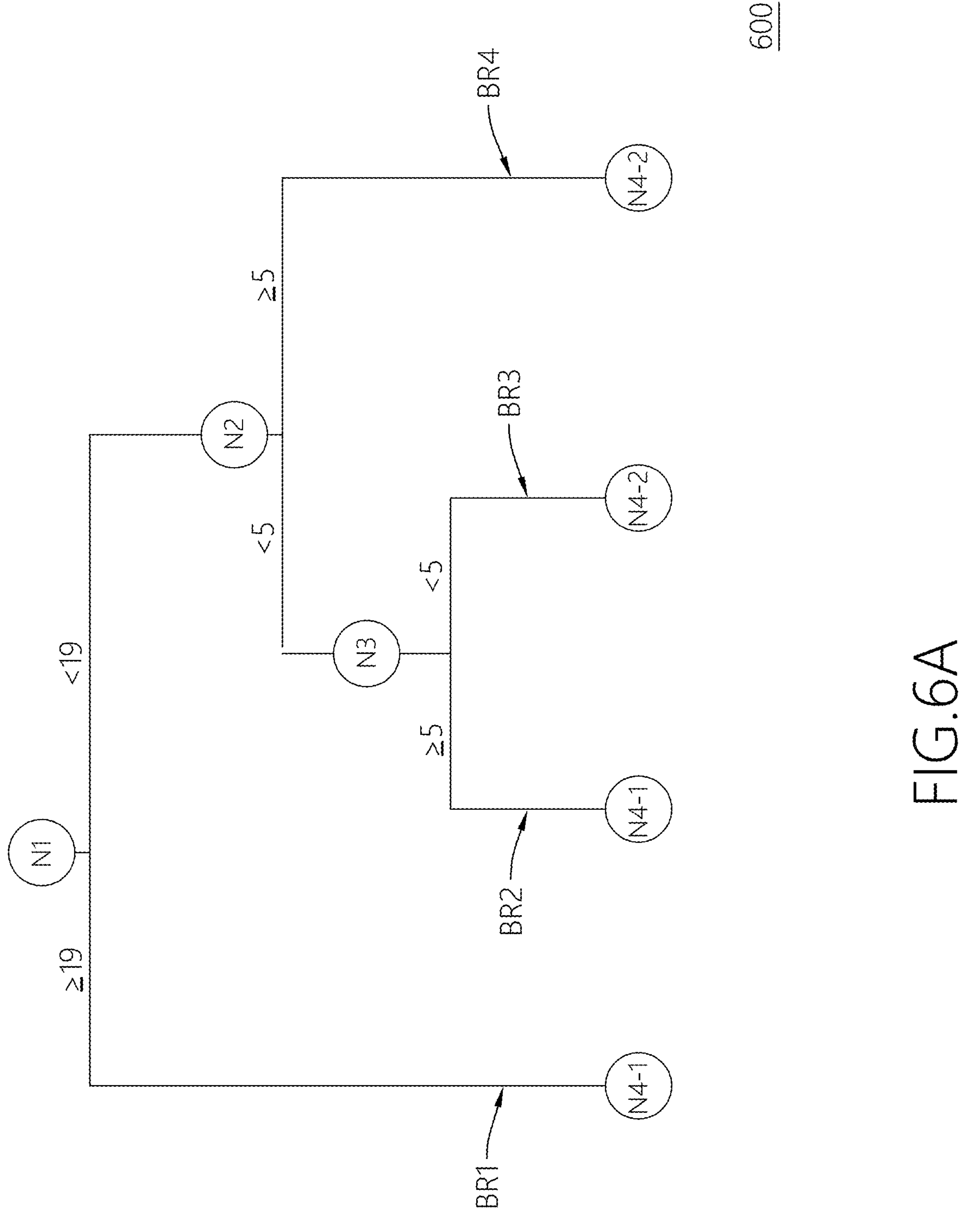
FIG. 6A is a schematic diagram illustrating a decision tree, according to a second non-limiting example.
Figure 6B:
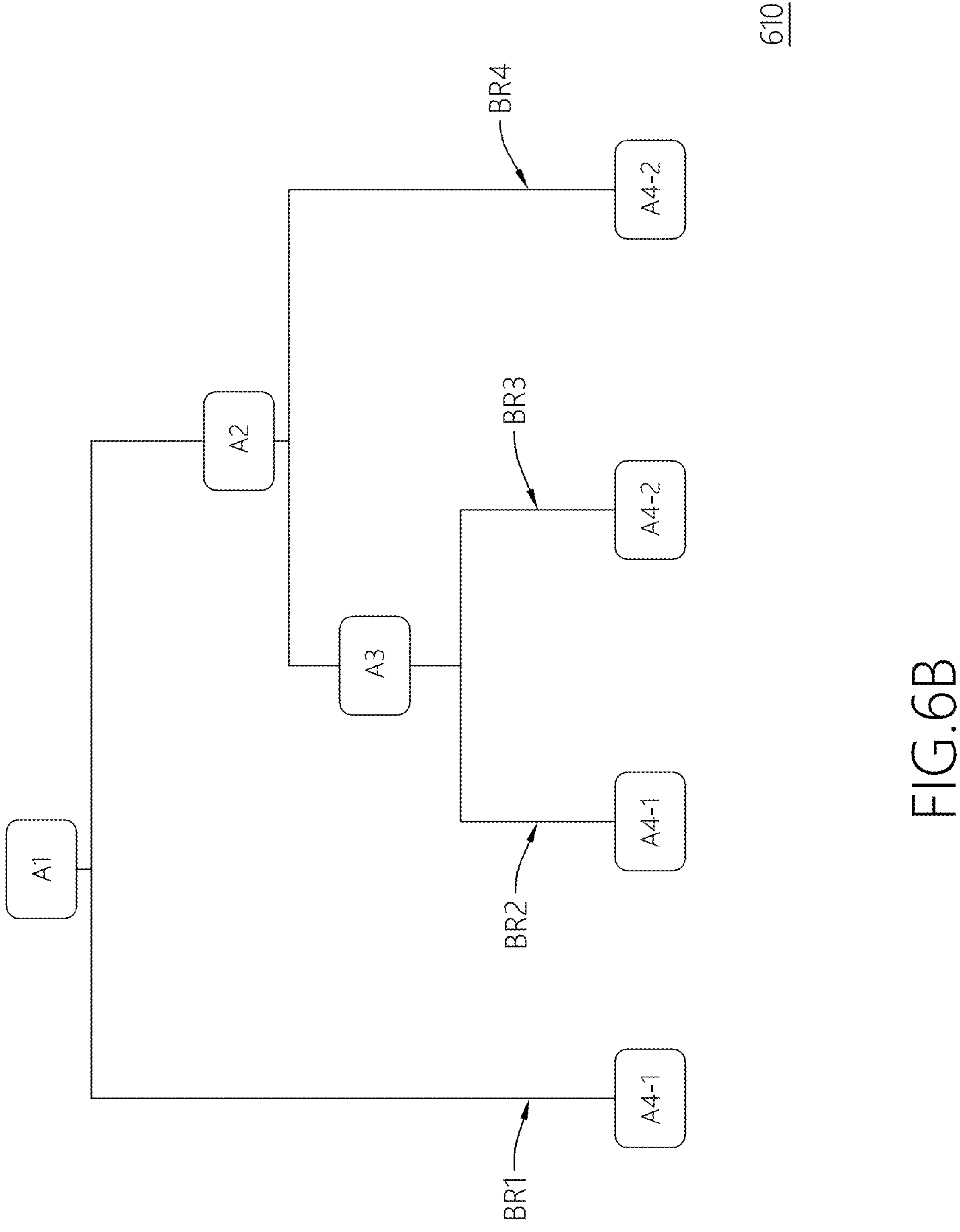
FIG. 6B is a schematic diagram illustrating an interactive multimedia designed based on the decision tree shown in FIG. 6A, according to the second non-limiting example.

FIG. 6A is a schematic diagram illustrating a decision tree 600, according to a second non-limiting example. FIG. 6B is a schematic diagram illustrating an interactive multimedia 610 designed based on the decision tree 600, according to the second non-limiting example.

As similar to the decision tree 500 described with reference to FIG. 5A, the decision tree 600 is generated based on source data designed for investigating relationship between respondents' attributes as predictor variables and their life satisfaction scales indicated by a target variable. However, the source data for generating the decision tree 600 may be different in terms of sampling and/or any other detail from the source data for generating the decision tree 600. Owing to data-driven nature, the decision trees 500, 600 may have different hierarchical tree structures. Specifically, predictor variables selected for a root node and internal nodes of the decision tree 600 may be different from the predictor variables selected for the root node and the internal nodes of the decision tree 500. Table 2 summarizes the predictor variables selected for a root node N1 and internal nodes N2, N3, as well as splitting rules based on the predictor variables.

TABLE 2

| Node | Predictor variable | Splitting rule |
|---|---|---|
| Root node N1 | Loneliness scale | Binary split into a subgroup with scale less than 19 (low to intermediate level of loneliness), and a subgroup with scale no less than 19 (high level of loneliness) |
| Internal node N2 | To what extent personal goals have been achieved, as compared to others at the same age | Binary split into a subgroup with scale less than 5 (few to some extent of goal achievement), and a subgroup with scale no less than 5 (high degree of goal achievement) |
| Internal node N3 | Depression symptom severity | Binary split into a subgroup with scale no less than 5 (severe symptom of depression), and a subgroup with scale less than 5 (no to some symptom of depression) |

As a result of the classification through the nodes, the source data is partitioned into subgroups respectively homogeneous in terms of life satisfaction scale. Specifically, subsets of the source data represented by branches BR1, BR2 show low life satisfaction, which is indicated by leaf nodes N4-1. On the other hand, subsets of the source data represented by branches BR3, BR4 show high life satisfaction, which is indicated by leaf nodes N4-2.

User interface of the interactive multimedia 610 shown in FIG. 6B is designed based on the decision tree 600. A first level interactive activity A1 at a first level of the user interface of the interactive multimedia 610 is designed based on the splitting rule of the root node N1 in the decision tree 600, to evaluate loneliness of a player through interaction with the player. For instance, the first level activity A1 may initiate conversation with the player (e.g., through one or more non-player character(s)), and assess loneliness level of the player by interpreting response provided by the player. Alternatively, the first level activity A1 may present one or more situation(s)/event(s)/object(s) by image(s) and/or video(s), and interpret reaction of the player in response to the event(s), to assess loneliness level of the player. It should be understood that, more options or combinations of different options may be otherwise applied to evaluate the loneliness scale of the player. Based on the loneliness scale of the player, a story line LN is determined for the player to proceed to the next level of the user interface. Specifically, for example, which of the two story lines LN split from the first level interactive activity A1 is determined by comparing a scale of the loneliness of the player with the critical scale of loneliness used for the splitting rule at the root node N1.

Similar approaches may be used for designing a second level interactive activity A2 at a second level of the user interface and a third level interactive activity A3 at a third level of the user interface. Particularly, the second level interactive activity A2 at the second level of the user interface of the interactive multimedia 610 is designed based on the splitting rule of the internal node N2 in the decision tree 600, to evaluate what extent the player would achieve his/her personal goals. For instance, the second level interactive activity A2 may provide several routine tasks for the player. Based on task progress performed by the player, an extent the player would achieve his/her personal goals may be evaluated, and which of two story lines LN split from the second level interactive activity A2 is determined. It should be noted that, more options or combinations of different options may be otherwise applied to evaluate features of the player at each of the interactive activities A1, A2, A3. The present disclosure is not limited to specific interactive activity provided at each interactive activity.

Story lines LN1, LN2 from the first level interactive activity A1 and the third level interactive activity A3 lead to fourth level interactive activities A4-1, which are designed based on the outcome indicated by the leaf nodes N4-1 (i.e., low life satisfaction). As an example (but not limited to), one of the fourth level interactive A4-1 provides a virtual environment in which the player can explore and interact with non-player character(s). Particularly, the virtual environment is designed to allow the player to experience negative feelings resulted from low life satisfaction. For instance, the virtual environment may be provided with low color saturation and low contrast, to create a predominantly gray space. In addition, muffled sounds with echoes may be accompanied to evoke a sense of loneliness, and/or background music may be slow and somber.

Further, non-player character(s) in the virtual environment may speak at a slow pace, and be indifferent or non-responsive to the player. In response to concerns paid by the non-player character(s), the player may be limited to respond in a dismissive or cold manner. Eventually, image gradually fades to gray, symbolizing the player's descent into negative emotions. Also, movement of the player is greatly limited, with controller response slows down, to simulate an impact of the psychological state. As an option, the fourth level interactive activities A4-1 may be designed identically. Alternatively, the fourth level interactive activities A4-1 may be designed differently, but both present experience of low life satisfaction.

On the other hand, story lines LN3, LN4 from the third level interactive activity A3 and the second level interactive activity A2 lead to fourth level interactive activities A4-2, which are designed based on the outcome indicated by the lead nodes N4-2 (i.e., high life satisfaction). As an example (but not limited to), one of the fourth level interactive A4-2 provides a virtual environment in which the player can explore and interact with non-player character(s). Particularly, the virtual environment is designed to allow the player to experience positive feelings resulted from high life satisfaction. For instance, the virtual environment may be provided with vibrant colors, lively and dynamic background music and having various interactive elements. Also, the virtual environment may be dynamic, with weather change and background music adapting to the player's actions. In regarding interaction, the non-player character(s) may provide response quickly during conversation, and option buttons for the player may be flexible and responsive, for boosting immersion. As an option, the fourth level interactive activities A4-2 may be designed identically. Alternatively, the fourth level interactive activities A4-2 may be designed differently, but both present experience of high life satisfaction.

The interactive multimedia 610 may be included in a interactive application the same as or similar to the interactive application 520 described with reference to FIG. 5C. For conciseness, detailed description of such interactive application would not be repeated herein.

Figure 7A:
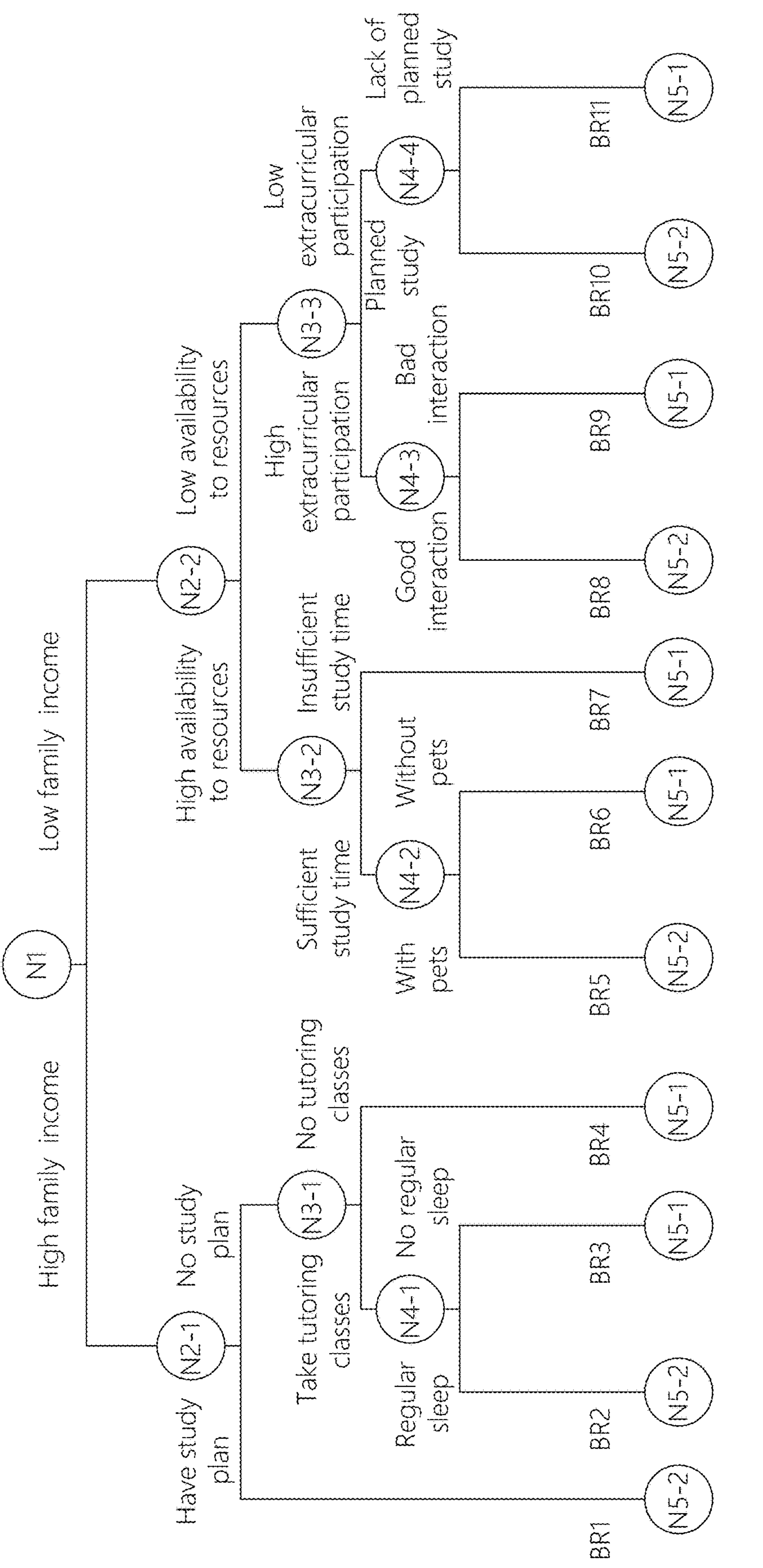
FIG. 7A is a schematic diagram illustrating a decision tree, according to third and fourth non-limiting examples.
Figure 7B:
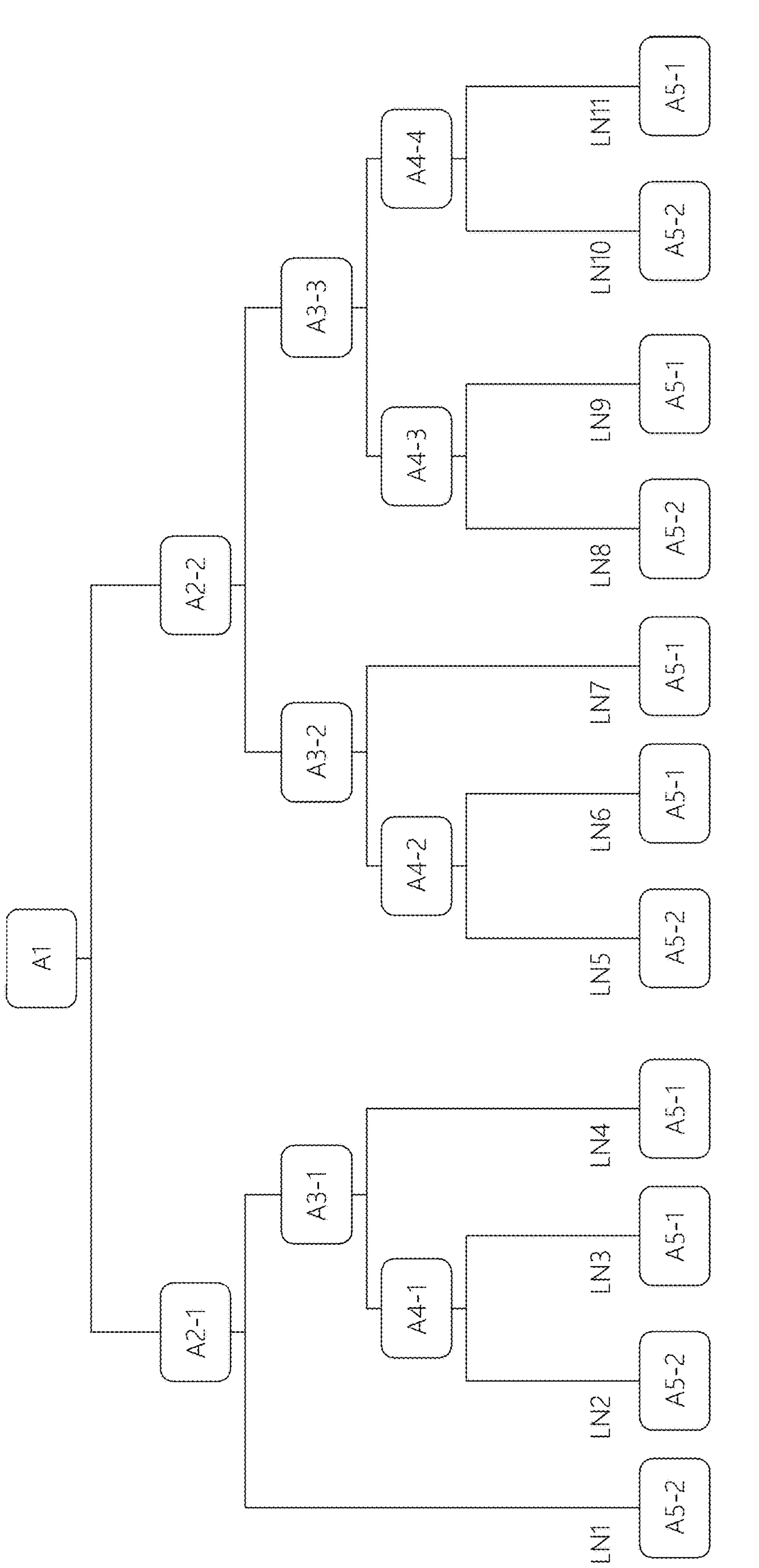
FIG. 7B is a schematic diagram illustrating an interactive multimedia designed based on the decision tree shown in FIG. 7A, according to the third and fourth non-limiting examples.

FIG. 7A is a schematic diagram illustrating a decision tree 700, according to third and fourth non-limiting examples. FIG. 7B is a schematic diagram illustrating an interactive multimedia 710 designed based on the decision tree 700, according to the third and fourth non-limiting examples.

The decision tree 700 is generated based on source data designed for investigating relationship between students' attributes as predictor variables and their academic performances indicated by a target variable. By running attribute selection process, these predictor variables are ranked, and those with high importance are selected for a root node N1 and internal nodes N2-1, N2-2, N3-1, N3-2, N3-3, N4-1, N4-2, N4-3, N4-4 of the decision tree 700. By passing down the source data, the source data is classified according to splitting rules at the root node N1 and the internal nodes N2-1, N2-2, N3-1, N3-2, N3-3, N4-1, N4-2, N4-3, N4-4, into homogeneous groups mapped to leaf nodes N5-1, N5-2 indicating low academic performance and high academic performance, respectively. Table 3 summarizes predictor variables corresponding to the root node N1 and the internal nodes N2-1, N2-2, N3-1, N3-2, N3-3, N4-1, N4-2, N4-3, N4-4, as well as the splitting rules based on the predictor variables.

TABLE 3

| Node | Predictor variable | Splitting rule |
|---|---|---|
| Root node N1 | Family income | Binary split into a subgroup with high family income, and a subgroup with low family income |
| Internal node N2-1 | study plan | Binary split into a subgroup with study plan made and followed, and a subgroup without study plan or with inadequate study plan |
| Internal node N2-2 | Availability of learning resources | Binary split into a subgroup with high availability of learning resources, and a subgroup with low availability of learning resources |

TABLE 3-continued

| Node | Predictor variable | Splitting rule |
|---|---|---|
| Internal node N3-1 | Tutoring classes | Binary split into a subgroup with tutoring classes taken, and a subgroup without taking tutoring classes |
| Internal node N3-2 | Study time | Binary split into a subgroup with no less than 20 hours of study time per week, and a subgroup with less than 20 hours of study time per week |
| Internal node N3-3 | Extracurricular activities participation | Binary split into a subgroup with low extracurricular activities participation, and a subgroup with high extracurricular activities participation |
| Internal node N4-1 | Sleep habit | Binary split into a subgroup with regular sleep habit, and a subgroup without regular sleep habit |
| Internal node N4-2 | Pet | Binary split into a subgroup with having a pet, and a subgroup without having a pet |
| Internal node N4-3 | Teacher-student interaction | Binary split into a subgroup with high teacher-student interaction frequency, and a subgroup with low teacher-student interaction frequency |
| Internal node N4-4 | Exam preparation effectiveness | Binary split into a subgroup with high exam preparation effectiveness (planned study), and a subgroup with low exam preparation effectiveness (lack of planned study) |

As a result of the classification through the nodes, the source data is partitioned into subgroups respectively homogeneous in terms of academic performance. Specifically, subsets of the source data represented by branches BR3, BR4, BR6, BR7, BR9, BR11 show poor academic performance (e.g., low grade point average (GPA)), which is indicated by the leaf nodes N5-1. On the other hand, subsets of the source data represented by branches BR1, BR2, BR5, BR8, BR10 show great academic performance (e.g., high GPA), which is indicated by the leaf nodes N5-2.

According to the third non-limiting example, the interactive multimedia 710 based on the decision tree 700 is designed to be an interactive multimedia for education consultation, such as a web-based interactive multimedia for education consultation. A first level interactive activity A1 at a first level of the user interface of the interactive multimedia 710 is designed based on the splitting rule of the root node N1 in the decision tree 700, to inquire family income of a user through interaction with the user. For instance, the first level activity A1 may initiate conversation with the user, and inquire family income of the user during conversation. It should be understood that, more options or combinations of different options may be otherwise applied to inquire family income of the user. Based on family income of the user, a story line LN is determined for the user to proceed to the next level of the user interface. Specifically, for example, which of the two story lines LN split from the first level interactive activity A1 is determined by comparing the family income of the player with the critical level of family income used for the splitting rule at the root node N1.

Similar approaches may be used for designing second level interactive activities A2-1, A2-2 at a second level of the user interface, third level interactive activities A3-1, A3-2, A3-3 at a third level of the user interface, and fourth level interactive activities A4-1, A4-2, A4-3, A4-4 at a fourth level of the user interface. Specifically, the second level interactive activities A2-1, A2-2 at the second level of the user interface of the interactive multimedia 710 are designed based on the splitting rule of the internal nodes N2-1, N2-2 in the decision tree 700, respectively. The third level interactive activities A3-1, A3-2, A3-3 at the third level of the user interface are designed based on the splitting rules of the internal nodes N3-1, N3-2, N3-3 in the decision tree 700, respectively. In addition, the fourth level interactive activities A4-1, A4-2, A4-3, A4-4 at the fourth level of the user interface are designed based on the splitting rules of the internal nodes N4-1, N4-2, N4-3, N4-4 in the decision tree 700, respectively.

Lines LN3, LN4, LN6, LN7, LN9, LN11 from the fourth level interactive activity A4-1, the third level interactive activity A3-1, the fourth level interactive activity A4-2, the third level interactive activity A3-2, the fourth level interactive activity A4-3 and the fourth level interactive activity A4-4 lead to fifth level interactive activities A5-1, which are designed based on the outcome indicated by the leaf nodes N5-1 (i.e., poor academic performance). Specifically, each of the fifth level interactive activities A5-1 may present the predicted academic performance (i.e., poor academic performance) to the user, and may further point out key issue(s) resulting the poor academic performance to the user, based on the decision tree 700. For instance, in addition to presenting the predicted academic performance, the fifth level interactive activity A5-1 to which the line LN3 leads may point out that lacking study plan is key to separate poor academic performance from great academic performance, under the circumstance of low family income. Since different fifth level interactive activities A5-1 may have different (combinations of) factors leading to poor academic performance, the analysis provided by different fifth interactive activities A5-1 may be different from one another.

Moreover, each of the fifth level interactive activities A5-1 may present a plan for improving the user's academic performance, based on the decision tree 700. For instance, if the user is supported by high family income and in this case the key factor leading to poor academic performance is lack of study plan, the corresponding fifth level interactive activity A5-1 may provide a study plan for the user, such as redirecting to another webpage designed for generating a customized study plan for the user. In addition, if the user is supported by high family income and taking tutoring classes but does not have a study plan nor a regular sleep habit, an efficient way to improved academic performance according to the decision tree 700 may be establishing regular sleep habit, and the corresponding fifth interactive activity A5-1 may provide suggestions for helping the user to build regular sleep habit. On the other hand, if the user is raised with low family income, an effective way to improve academic performance may be enhancing effectiveness of exam preparation, when the user's availability of learning resources is low, participation in extracurricular activities is high and effectiveness of exam preparation is low. In this case, the corresponding fifth level interactive activity A5-1 may provide suggestions for the user to build a structured study plan. In addition, if the user is raised with low family income, an effective way to improve academic performance may be enhancing teacher-student interactions when the user has low availability of learning resources, low participation in extracurricular activities and low teacher-student interaction frequency, and the corresponding fifth level interactive activity A5-1 may provide suggestions on learning through questioning and discussions, learning improving communication skills and/or recommendations of online tutoring or mentorship. Further, if the user is raised with low family income and his/her availability of learning resources is low but well participated in extracurricular activities, an effective way to improve academic performance may be balancing study and extracurricular activities, such as making a structured study plan. In this case, the corresponding fifth level interactive activity A5-1 may provide a study plan for the user On the other hand, lines LN1, LN2, LN5, LN8, LN10 from the second level interactive activity A2-1, the fourth level interactive activity A4-1, the fourth level interactive activity A4-2, the fourth level interactive activity A4-3, the fourth level interactive activity A4-4 lead to fifth level interactive activities A5-2, which are designed based on the outcome indicated by the leaf nodes N5-2 (i.e., great academic performance). Specifically, each of the fifth level interactive activities A5-2 may present the predicted academic performance (i.e., poor academic performance) to the user. Optionally, since the users proceeding to the fifth level interactive activities A5-2 may have great academic performance, the fifth level interactive activities A5-2 may provide suggestions on maintaining a healthy lifestyle. For instance, the fifth level interactive activities A5-2 may provide effective study strategies, help users to prioritize time management or so forth.

According to the fourth non-limiting example, the interactive multimedia 710 based on the decision tree 700 is designed to be a learning simulation game, which is similar to the education consultation application according to the third non-limiting example, except that the fifth level interactive activities A5-1, A5-2 in the learning simulation game according to the fourth non-limiting example may provide further interactions.

Specifically, if one of the fifth level interactive activities A5-1 provides analysis to indicate that having a pet is important for a player to release stress and therefore improve academic performance, the fifth level interactive activity A5-1 may further provide a virtual pet to interact with the player. If the player already has a pet, the fifth level interactive activity A5-1 may suggest a pet companionship time to manage a healthy but effective balance. In addition, if one of the fifth level interactive activities A5-1 provides analysis to indicate that better time management is key for a player to improve academic performance, the fifth level interactive activity A5-1 may initiate conversation with the player to inquire living habits of the player, and provide a customized learning schedule according to the living habits. Likewise, other fifth level interactivities A5-1 may provide respective interactions for helping academic performance of players, according to the decision tree 700. Also, the fifth level interactive activities A5-2 may provide respective interactions for helping players with great academic performance to maintain a healthy lifestyle. However, it should be understood that this fourth non-limiting example should not be limited to specific interactions provided by the fifth level interactive activities A5-1, A5-2.

Figure 8B:
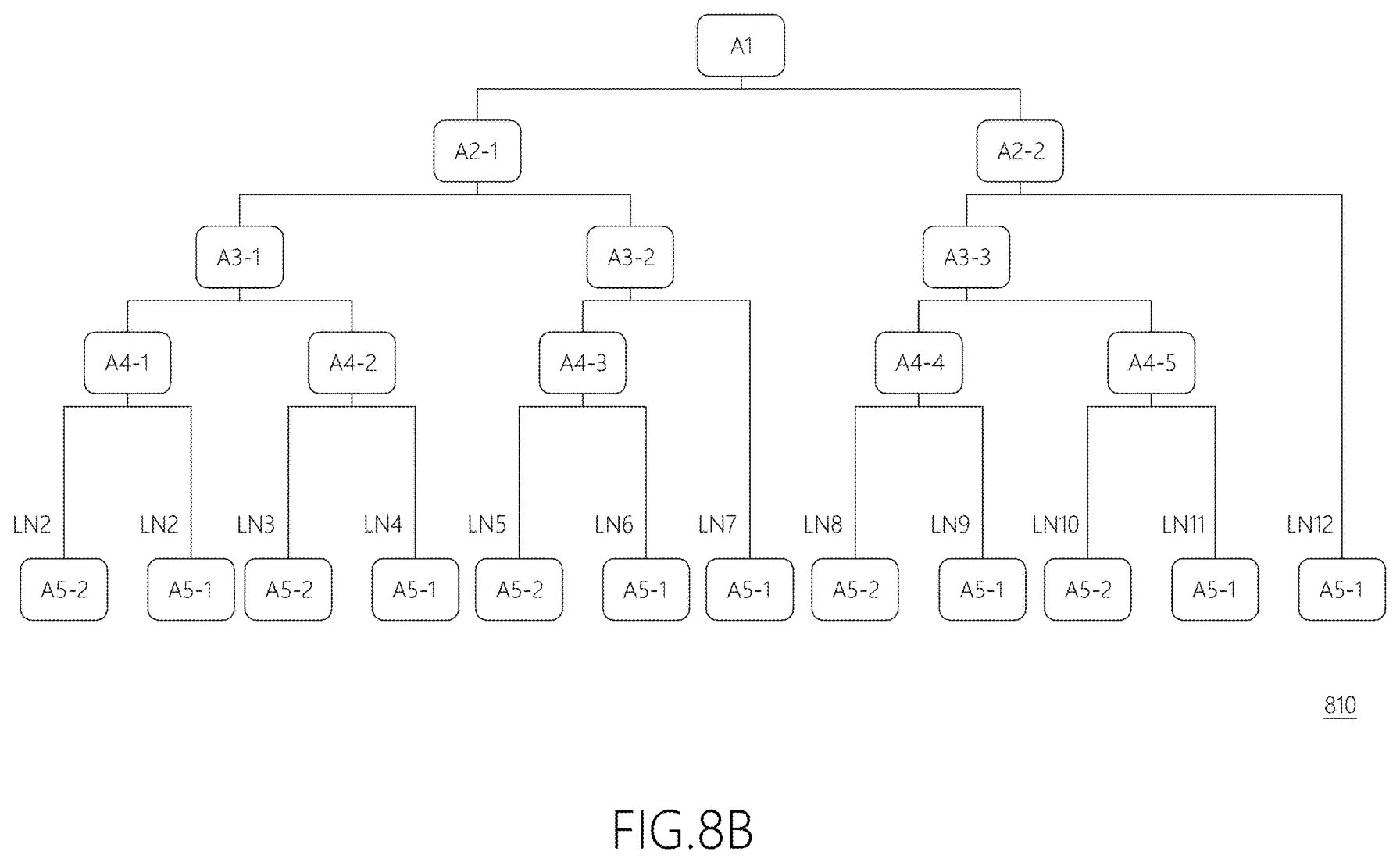

FIG. 8A is a schematic diagram illustrating a decision tree 800, according to a fifth non-limiting example. FIG. 8B is a schematic diagram illustrating an interactive multimedia 810 designed based on the decision tree 800, according to the fifth non-limiting example.

The decision tree 800 is generated based on source data designed for analyzing relationship between hospitals' institutional factors and success rates for the hospitals to utilize AI-assisted diagnosis. The institutional factors are predictor variables, whereas the success rates of AI utilization are indicated by a target variable. By running attribute selection process, these predictor variables are ranked, and those with high importance are selected for a root node N1 and internal nodes N2-1, N2-2, N3-1, N3-2, N3-3, N4-1, N4-2, N4-3, N4-4, N4-5 of the decision tree 700. By passing down the source data, the source data is classified according to splitting rules at the root node N1 and the internal nodes N2-1, N2-2, N3-1, N3-2, N3-3, N4-1, N4-2, N4-3, N4-4, N4-5, into homogeneous groups mapped to leaf nodes N5-1, N5-2 indicating low success rate of AI utilization and high success rate of AI utilization, respectively. Table 4 summarizes predictor variables corresponding to the root node N1 and the internal nodes N2-1, N2-2, N3-1, N3-2, N3-3, N4-1, N4-2, N4-3, N4-4, N4-5, as well as the splitting rules based on the predictor variables.

TABLE 4

| Node | Predictor variable | Splitting rule |
| --- | --- | --- |
| Root node N1 | Having integrated electronic health record (EHR) system or not | Binary split into a subgroup with the EHR system, and a subgroup without the EHR system |
| Internal node N2-1 | Whether AI module has been embedded in clinical workflow | Binary split into a subgroup with AI module being embedded in clinical workflow, and a subgroup without AI module being embedded in clinical workflow |
| Internal node N2-2 | Having a dedicated department managing AI-supported consultations or not | Binary split into a subgroup with dedicated department, and a subgroup without dedicated department |
| Internal node N3-1 | Complete standardized training for medical staff | Binary split into a subgroup with complete standardized training for |

TABLE 4-continued

| Node | Predictor variable | Splitting rule |
|---|---|---|
| | | medical staff, and a subgroup without complete standardized training for medical staff |
| Internal node N3-2 | Dedicated funding for AI project | Binary split into a subgroup with dedicated funding for AI project, and a subgroup without dedicated funding for AI project |
| Internal node N3-3 | Planned funding for system digitalization | Binary split into a subgroup with planned funding for system digitalization, and a subgroup without planned funding for system digitalization |
| Internal node N4-1 | Does staff understand that AI suggestions are not final physician decisions? | Binary split into a subgroup with staff having sufficient awareness, and a subgroup with staff having sufficient awareness |
| Internal node N4-2 | Visual or voice cues (e.g., highlighted screens or audio emphasis) | Binary split into a subgroup with visual or voice cues, and a subgroup without visual or voice cues |
| Internal node N4-3 | Working hours per week for physicians | Binary split into a subgroup with physicians work for no less than 65 hours per week, and a subgroup with physician work for less than 65 hours per week |
| Internal node N4-4 | Does medical staff trust AI generated decisions? | Binary split into a subgroup with medical staff generally trusts AI generated decisions, and a subgroup with medical staff generally does not trust AI generated decisions |
| Internal node N4-5 | Dedicated support personnel for real-time assistance | Binary split into a subgroup with dedicated support personnel for real-time assistance, and a subgroup without dedicated support personnel for real-time assistance |

As a result of the classification through the nodes, the source data is partitioned into subgroups respectively homogeneous in terms of success rate of AI utilization. Specifically, subsets of the source data represented by branches BR2, BR4, BR6, BR7, BR9, BR11, BR12 show low success rate of AI utilization, which is indicated by leaf nodes N5-1. On the other hand, subsets of the source data represented by branches BR1, BR3, BR5, BR8, BR10 show high success rate of AI utilization, which is indicated by leaf nodes N5-2.

According to the fifth non-limiting example, the interactive multimedia 810 based on the decision tree 800 is designed to be an interactive multimedia for supporting decision making and analyzing decisions in regarding management of a hospital. A user of the interactive multimedia 810 may be a decision maker of a hospital, or an external consultant providing consultation service for the hospital. A first level interactive activity A1 at a first level of the user interface of the interactive multimedia 810 is designed based on the splitting rule of the root node N1 in the decision tree 800, to inquire if the hospital has an EHR system. For instance, the first level activity A1 may initiate conversation with the user, and inquire if the hospital has an EHR system. Based on the answer provided by the user, one of two lines LN from the first level interactive activity A1 is determined for the user to proceed to the next level of the user interface.

Similar approaches may be used for designing second level interactive activities A2-1, A2-2 at a second level of the user interface, third level interactive activities A3-1, A3-2, A3-3 at a third level of the user interface and fourth level interactive activities A4-1, A4-2, A4-3, A4-4, A4-5 at a fourth level of the user interface. It should be noted that, one of various options or combinations of different options may be applied to evaluate an institutional factor of the hospital at each of the interactive activities A1, A2-1, A2-2, A3-1, A3-2, A3-3, A4-1, A4-2, A4-3, A4-4, A4-5. The present disclosure is not limited to specific interactive activity provided at each interactive activity.

Lines LN2, LN4, LN6, LN7, LN9, LN11, LN12 from the fourth level interactive activity A4-1, the fourth level interactive activity A4-2, the fourth level interactive activity A4-3, the third level interactive activity A3-2, the fourth level interactive activity A4-4, the fourth level interactive activity A4-5 and the second level interactive activity A2-2 lead to fifth level interactive activities A5-1, which are designed based on the outcome indicated by the leaf nodes N5-1 (i.e., low success 10 rate of AI utilization). Specifically, each of the fifth level interactive activities A5-1 may present the predicted success rate of AI utilization (i.e., low success rate of AI utilization) to the user, and may further point out reason(s) resulting the low success rate of AI utilization to the user, based on the decision tree 800. For instance, in addition to presenting the predicted success rate of AI utilization, the fifth level interactive activity A5-1 to which the line LN4 leads further points out that lack of standardized training for medical staff (the internal node N3-1) and absence of visual or voice cues (the internal node N4-2) may cause confusion about where a diagnosis came from, is it from a doctor or AI prediction? This eventually results in loss of patients' trust, and fail of AI utilization. Optionally, the fifth level interactive activities A5-1 may present respective parts of the decision tree 800 to the user, and highlight key step(s) (i.e., lines) leading to low success rate of AI utilization. Further, the fifth level interactive activities A5-1 may further provide respective suggestions for improving success rate of AI utilization, based on the corresponding key steps leading to low success rate of AI utilization. In this way, the interactive multimedia 810 not only predicts outcome of AI utilization, but also provides coaching for better use of AI technology in hospitals.

On the other hand, lines LN1, LN3, LN5, LN8, LN10 from the fourth level interactive activity A4-1, the fourth level interactive activity A4-2, the fourth level interactive activity A4-3, the fourth level interactive activity A4-4 and the fourth level interactive activity A4-5 lead to fifth level interactive activities A5-2, which are designed based on the outcome indicated by the leaf nodes N5-2 (i.e., high success rate of AI utilization). Specifically, each of the fifth level interactive activities A5-2 may present the predicted success rate of AI utilization (i.e., high success rate of AI utilization) to the user. Optionally, the fifth level interactive activities A5-2 may present key factors leading to the favorable outcome to the user. As another option, the fifth level interactive activities A5-2 may further present other paths leading to the high success rate of AI utilization, which provides more flexibility on management of the hospital.

Figure 9A:
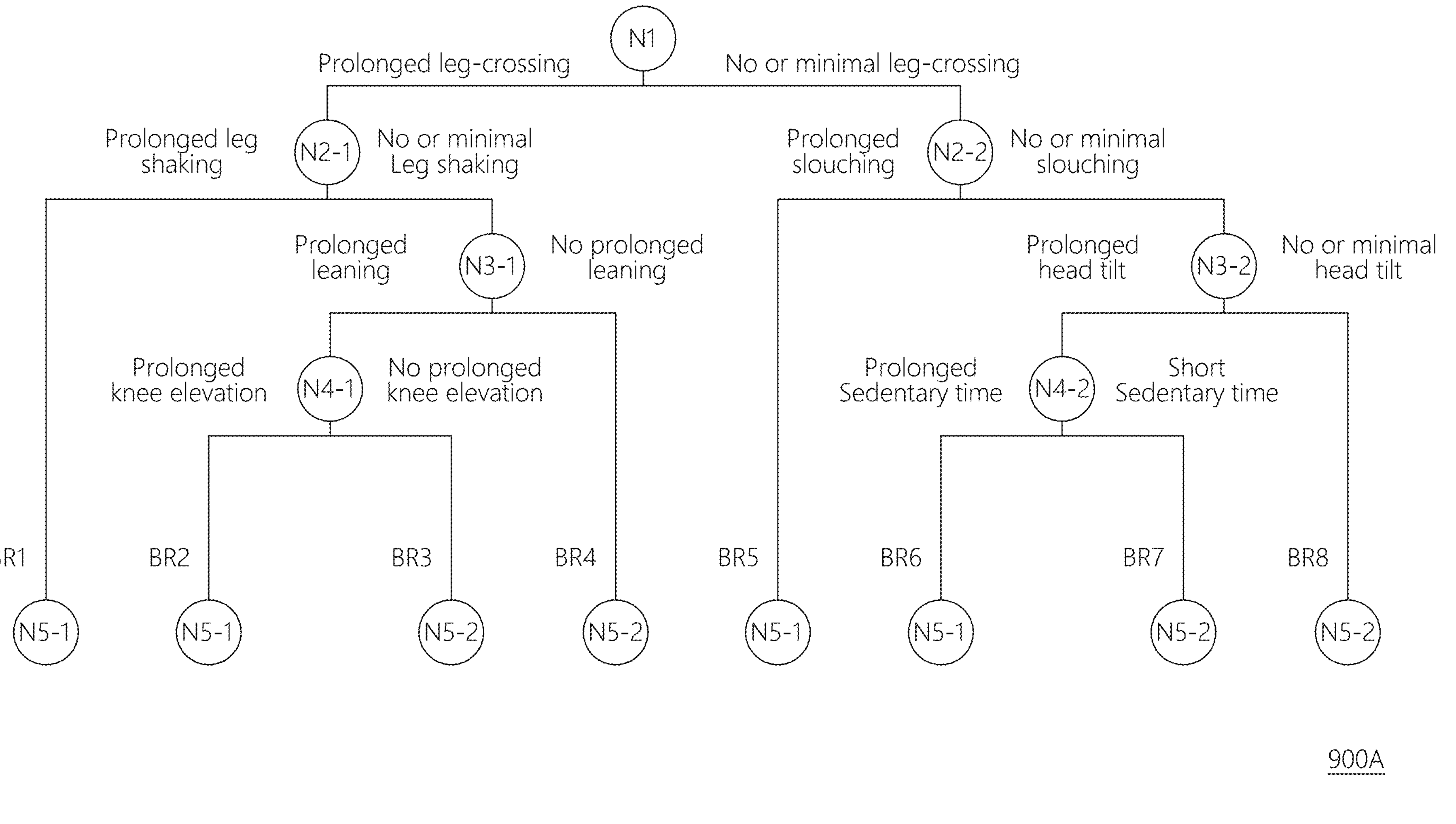
FIG. 9A FIG. 9B, FIG. 9C are schematic diagrams illustrating decision trees, according to a sixth non-limiting example.
Figure 9B:
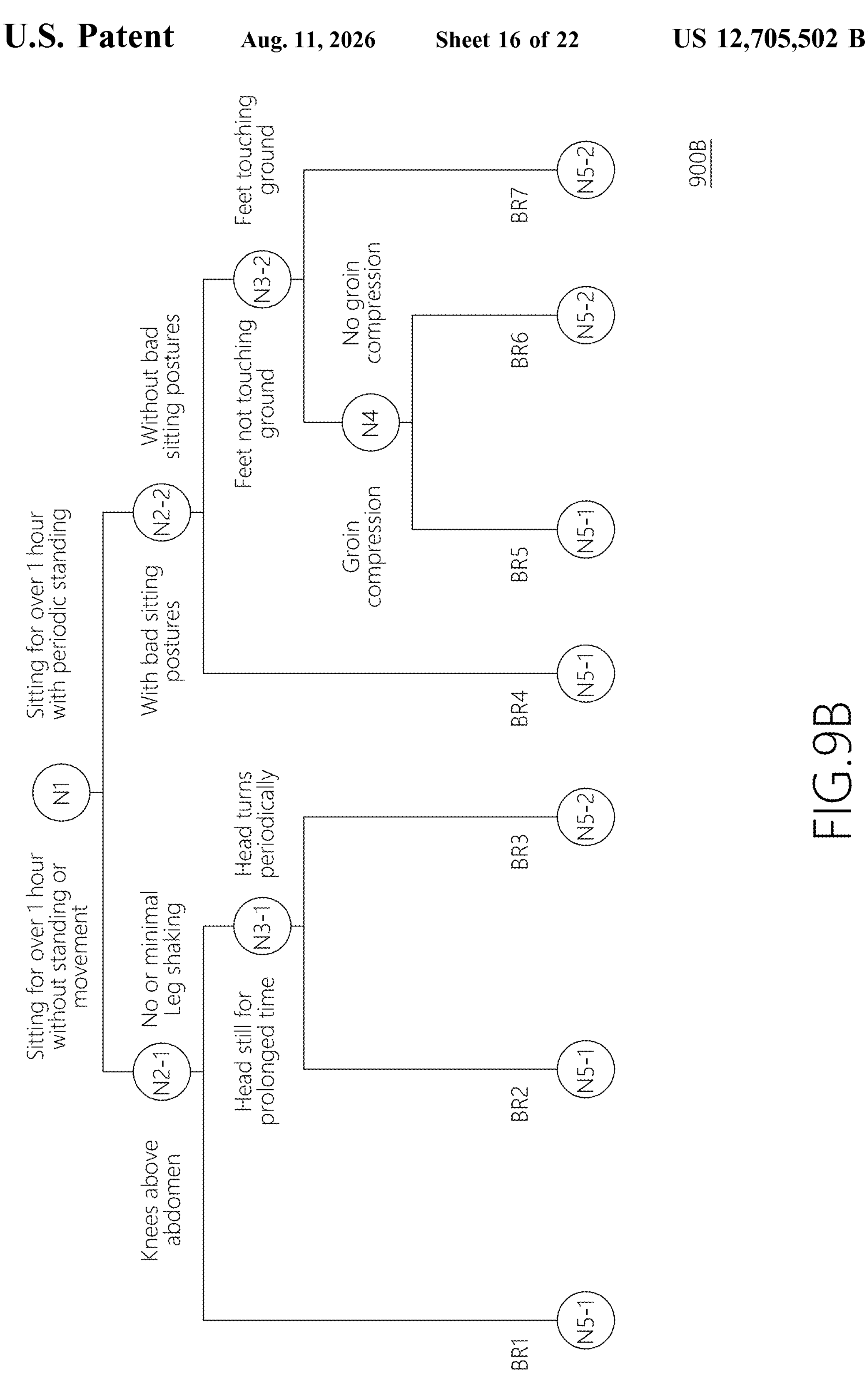
Figure 9C:
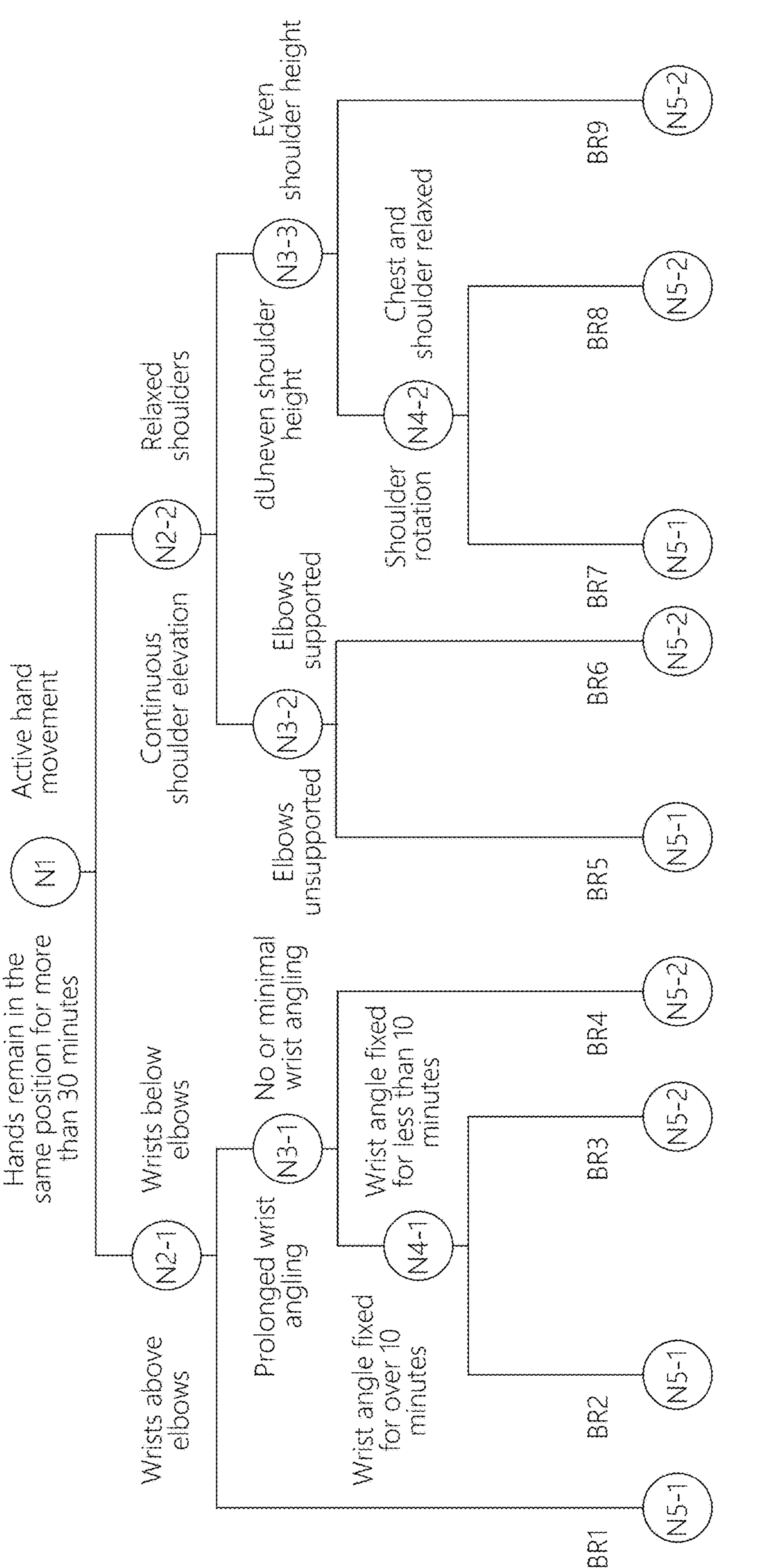
Figure 9D:
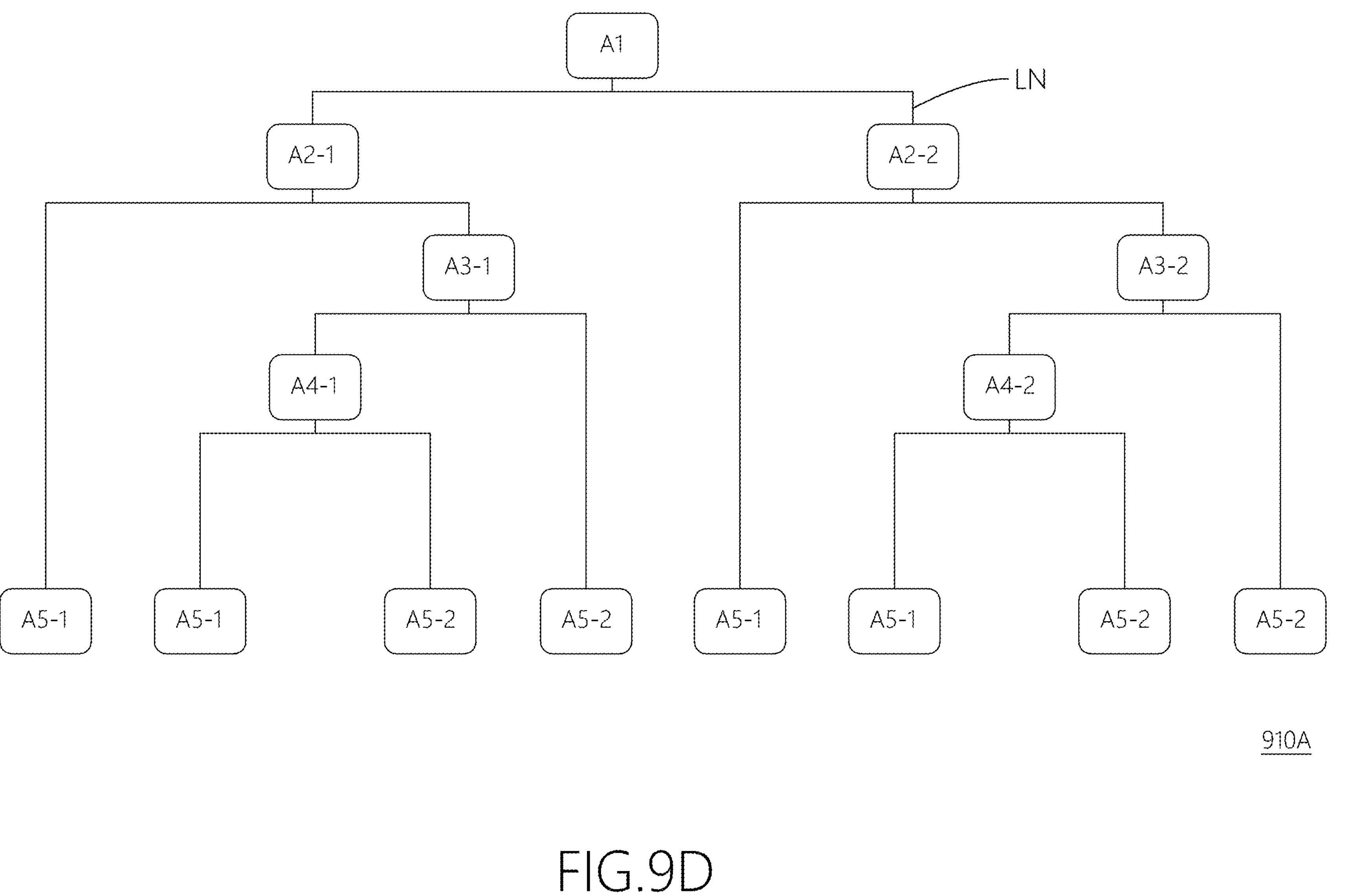
Figure 9E:
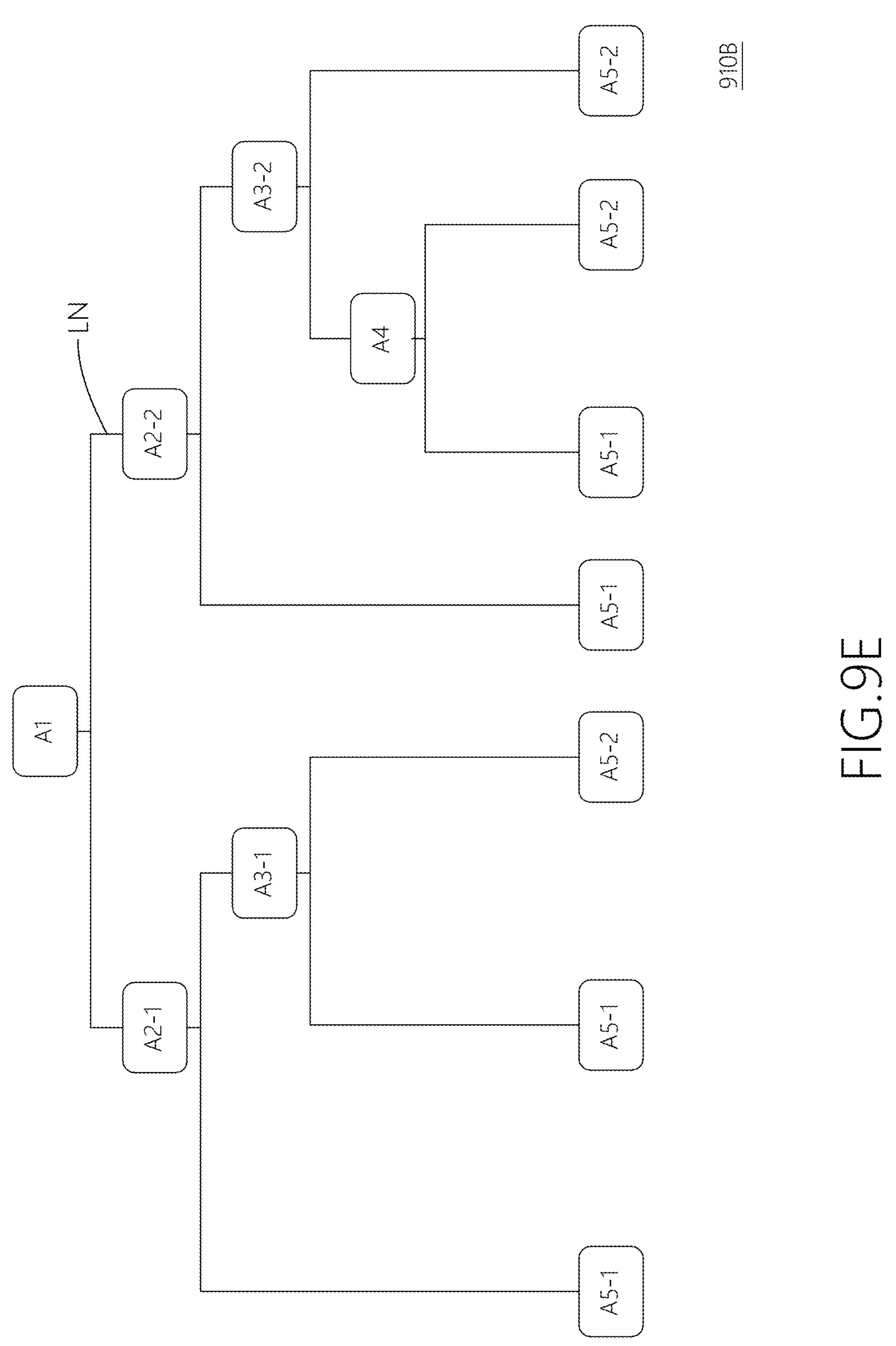
Figure 9F:
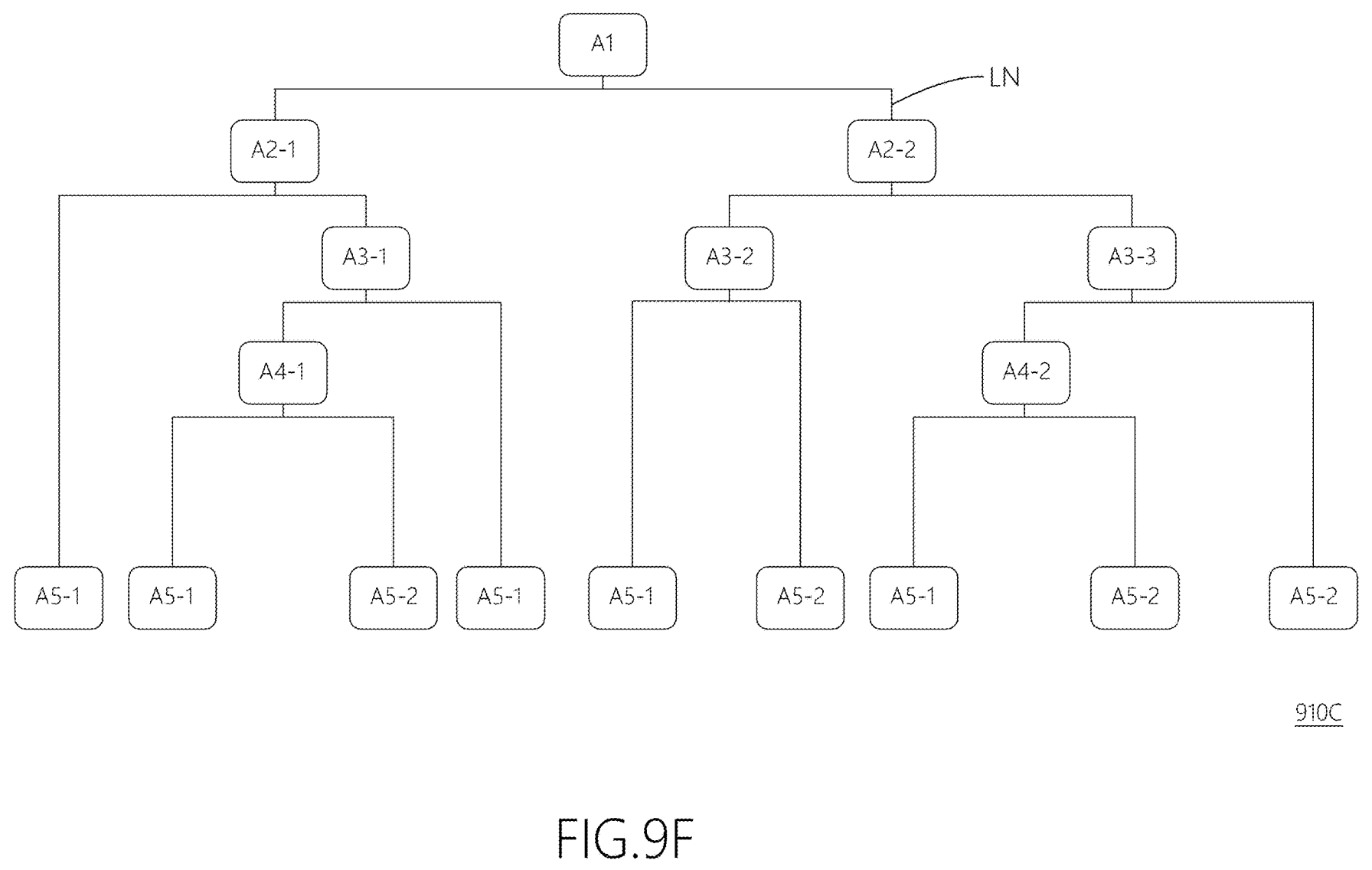

FIG. 9A FIG. 9B, FIG. 9C are schematic diagrams illustrating decision trees 900A, 900B, 900C, according to a sixth non-limiting example. FIG. 9D, FIG. 9E, FIG. 9F are schematic diagrams illustrating interactive multimedia 910A, 910B, 910C as parts of a health care application, according to the sixth non-limiting example.

The decision trees 900A, 900B, 900C are generated for predicting risk of different health problems. The interactive multimedia 910A, 910B, 910C are designed based on the decision trees 900A, 900B, 900C, and are integrated in a health care application aimed for predicting risk of different health problems and providing alerts and/or suggestions for reducing the risk. Particularly, the health care application is communicative with motion tracking sensors functioned as I/O devices. Interactive activities at levels of the user interface in each of the interactive multimedia 910A, 910B, 910C may be implemented by capturing users' static and/or dynamic postures using the motion tracking sensors. As an option, one or more of the motion tracking sensors may be embedded in at least one wearable device.

Referring to FIG. 9A, the decision tree 900A is generated based on source data designed for analyzing relationship between individuals' habitual behaviors and risk of spinal scoliosis. The habitual behaviors are predictor variables, whereas the risk of spinal scoliosis is indicated by a target variable. By running attribute selection process, these predictor variables are ranked, and those with high importance are selected for a root node N1 and internal nodes N2-1, N2-2, N3-1, N3-2, N4-1, N4-2 of the decision tree 900A. By passing down the source data, the source data is classified according to splitting rules at the root node N1 and the internal nodes N2-1, N2-2, N3-1, N3-2, N4-1, N4-2 into homogeneous groups mapped to leaf nodes N5-1, N5-2 indicating high risk of spinal scoliosis and low risk of spinal scoliosis, respectively. Table 5 summarizes predictor variables corresponding to the root node N1 and the internal nodes N2-1, N2-2, N3-1, N3-2, N4-1, N4-2, as well as the splitting rules based on the predictor variables.

TABLE 5

| Node | Predictor variable | Splitting rule |
|---|---|---|
| Root node N1 | Leg-crossing | Binary split into a subgroup with habitual behaviors including prolonged leg-crossing, and a subgroup with habitual behaviors not including prolonged leg-crossing |
| Internal node N2-1 | Leg shakings | Binary split into a subgroup with habitual behaviors including prolonged leg shaking, and a subgroup with habitual behaviors not including prolonged leg shaking |
| Internal node N2-2 | Slouching | Binary split into a subgroup with habitual behaviors including prolonged slouching, and a subgroup with habitual behaviors not including prolonged slouching |
| Internal node N3-1 | Leaning to one side while sitting | Binary split into a subgroup with habitual behaviors including prolonged leaning to one side while sitting, and a subgroup with habitual behaviors not including prolonged leaning to one side while sitting |
| Internal node N3-2 | Downward head tilt | Binary split into a subgroup with habitual behaviors including prolonged downward head tilt, and a subgroup with habitual behaviors not including prolonged downward head tilt |
| Internal node N4-1 | Elevation of knees over abdomen | Binary split into a subgroup with habitual behaviors including prolonged elevation of knees over abdomen, and a subgroup with habitual behaviors not including prolonged elevation of knees over abdomen |
| Internal node N4-2 | Sedentary time | Binary split into a subgroup with habitual behaviors including prolonged sedentary time, and a subgroup with habitual behaviors not including prolonged sedentary time |

As a result of the classification through the nodes, the source data is partitioned into subgroups respectively homogeneous in terms of risk of spinal scoliosis. Specifically, subsets of the source data represented by branches BR1, BR2, BR5, BR6 show high risk of spinal scoliosis, which is indicated by leaf nodes N5-1. On the other hand, subsets of the source data represented by branches BR3, BR4, BR7, BR8 show low risk of spinal scoliosis, which is indicated by leaf nodes N5-2.

Referring to FIG. 9B, the decision tree 900B is generated based on source data designed for analyzing relationship between individuals' habitual behaviors and risk of circulatory diseases. The habitual behaviors are predictor variables, whereas the risk of circulatory diseases is indicated by a target variable. By running attribute selection process, these predictor variables are ranked, and those with high importance are selected for a root node N1 and internal nodes N2-1, N2-2, N3-1, N3-2, N4 of the decision tree 900B. By passing down the source data, the source data is classified according to splitting rules at the root node N1 and the internal nodes N2-1, N2-2, N3-1, N3-2, N4, into homogeneous groups mapped to leaf nodes N5-1, N5-2 indicating high risk of circulatory diseases and low risk of circulatory diseases, respectively. Table 6 summarizes predictor variables corresponding to the root node N1 and the internal nodes N2-1, N2-2, N3-1, N3-2, N4, as well as the splitting rules based on the predictor variables.

TABLE 6

| Node | Predictor variable | Splitting rule |
| --- | --- | --- |
| Root node N1 | Prolonged sitting time | Binary split into a subgroup with habitual behaviors including sitting for over 1 hour without standing or movement, and a subgroup with habitual behaviors not including sitting for over 1 hour without standing or movement |
| Internal node N2-1 | Knee position | Binary split into a subgroup with habitual behaviors including prolonged elevation of knees over abdomen, and a subgroup with habitual behaviors not including prolonged elevation of knees over abdomen |
| Internal node N2-2 | Bad sitting postures including sitting cross-legged, sitting at low seat height and sitting with knees drawn inward | Binary split into a subgroup with habitual behaviors including the bad sitting postures, and a subgroup with habitual behaviors not including the bad sitting postures |
| Internal node N3-1 | Head turn | Binary split into a subgroup with habitual behaviors including head remaining still for a prolonged time, and a subgroup with habitual behaviors not including head remaining still for a prolonged time |
| Internal node N3-2 | Feet position while sitting | Binary split into a subgroup with habitual behaviors including feet touching ground while sitting, and a subgroup with habitual behaviors not including feet touching ground while sitting |
| Internal node N4 | Groin compression while sitting | Binary split into a subgroup with habitual behaviors including groin compression while sitting, and a subgroup with habitual behaviors not including groin compression while sitting |

As a result of the classification through the nodes, the source data is partitioned into subgroups respectively homogeneous in terms of risk of circulatory diseases. Specifically, subsets of the source data represented by branches BR1, BR2, BR4, BR5 show high risk of circulatory diseases, which is indicated by leaf nodes N5-1. On the other hand, subsets of the source data represented by branches BR3, BR5, BR6, BR7 show low risk of circulatory diseases, which is indicated by leaf nodes N5-2.

Referring to FIG. 9C, the decision tree 900C is generated based on source data designed for analyzing relationship between individuals' habitual behaviors and risk of nerve compression syndrome. The habitual behaviors are predictor variables, whereas the risk of nerve compression syndrome is indicated by a target variable. By running attribute selection process, these predictor variables are ranked, and those with high importance are selected for a root node N1 and internal nodes N2-1, N2-2, N3-1, N3-2, N3-3, N4-1, N4-2 of the decision tree 800C. By passing down the source data, the source data is classified according to splitting rules at the root node N1 and the internal nodes N2-1, N2-2, N3-1, N3-2, N3-3, N4-1, N4-2 into homogeneous groups mapped to leaf nodes N5-1, N5-2 indicating high risk of nerve compression syndrome and low risk of nerve compression syndrome, respectively. Table 7 summarizes predictor variables corresponding to the root node N1 and the internal nodes N2-1, N2-2, N3-1, N3-2, N3-3, N4-1, N4-2, as well as the splitting rules based on the predictor variables.

TABLE 7

| Node | Predictor variable | Splitting rule |
| --- | --- | --- |
| Root node N1 | Hand movement | Binary split into a subgroup with habitual behaviors including hands |

TABLE 7-continued

| Node | Predictor variable | Splitting rule |
|---|---|---|
| | | remaining still for more than 30 minutes, and a subgroup with habitual behaviors not including hands remaining still for more than 30 minutes |
| Internal node N2-1 | Wrist position | Binary split into a subgroup with habitual behaviors including keeping wrists above elbows, and a subgroup with habitual behaviors not including keeping wrists above elbows |
| Internal node N2-2 | Shoulder elevation | Binary split into a subgroup with habitual behaviors including constant shoulder elevation, and a subgroup with habitual behaviors not including constant shoulder elevation |
| Internal node N3-1 | Wrist angling | Binary split into a subgroup with habitual behaviors including prolonged wrist angling, and a subgroup with habitual behaviors not including prolonged wrist angling |
| Internal node N3-2 | Elbow support | Binary split into a subgroup with habitual behaviors including keeping elbows supported, and a subgroup with habitual behaviors not including keeping elbows supported |
| Internal node N3-3 | Evenness of shoulder height | Binary split into a subgroup with habitual behaviors including constant uneven shoulder height, and a subgroup with habitual behaviors not including constant uneven shoulder height |
| Internal node N4-1 | Wrist movement | Binary split into a subgroup with habitual behaviors including wrist angle maintained over 10 minutes, and a subgroup with habitual behaviors not including wrist angle maintained over 10 minutes |
| Internal node N4-2 | Shoulder internal rotation | Binary split into a subgroup with habitual behaviors including constant inward rotation of shoulders, and a subgroup with habitual behaviors not including constant inward rotation of shoulders |

As a result of the classification through the nodes, the source data is partitioned into subgroups respectively homogeneous in terms of risk of nerve compression syndrome. Specifically, subsets of the source data represented by branches BR1, BR2, BR4, BR5, BR7 show high risk of nerve compression syndrome, which is indicated by leaf nodes N5-1. On the other hand, subsets of the source data represented by branches BR3, BR6, BR8, BR9 show low risk of nerve compression risk, which is indicated by leaf nodes N5-2.

Referring to FIG. 9D, FIG. 9E and FIG. 9F, the interactive multimedia 910A, 910B, 910C are designed based on the decision trees 900A, 900B, 900C, respectively. Detailed mapping between the interactive multimedia 910A, 910B, 910C and the decision trees 900A, 900B, 900C is similar to previous non-limiting examples, and would not be repeated again. As described, the interactive activities in each of the interactive multimedia 910A, 910B, 910C, which are mapped to the root and internal nodes of the corresponding decision tree 900A/900B/900C, may include capturing users' static and/or dynamic postures using motion tracking sensors. The monitoring at these interactive activities may be performed simultaneously. By collecting motion tracking data for a certain period of time, combination of lines LN leading to one of interactive activities A5-1, A5-2 designed based on the leaf nodes N5-1, N5-2 of the corresponding decision tree 900A/900B/900C can be determined. In this way, risk of spinal scoliosis, risk of circulatory diseases and risk of nerve compression syndrome for the user can be predicted. To report the results, each of the interactive activities A5-1, A5-2 may present predicted risk of the corresponding health problem. Further, each of the interactive activities A5-1 may further provide suggestions to lower the risk of the health problem, such as presenting an animation to guide the user for correcting the user's habitual pattern. The user may interact with the animation by providing feedback, and the animation may adjust according to the user's feedback. As also described, the interactive multimedia 910A, 910B, 910C are integrated in a health care application, such as a health care application installed in a mobile phone or a portable device. The health care application may combine the reports, and provide a posture map and risk heat zone(s). Additionally, features as an achievement system or reminder tasks can be activated to enhance user motivation and increase engagement with the application.

Figure 10A:
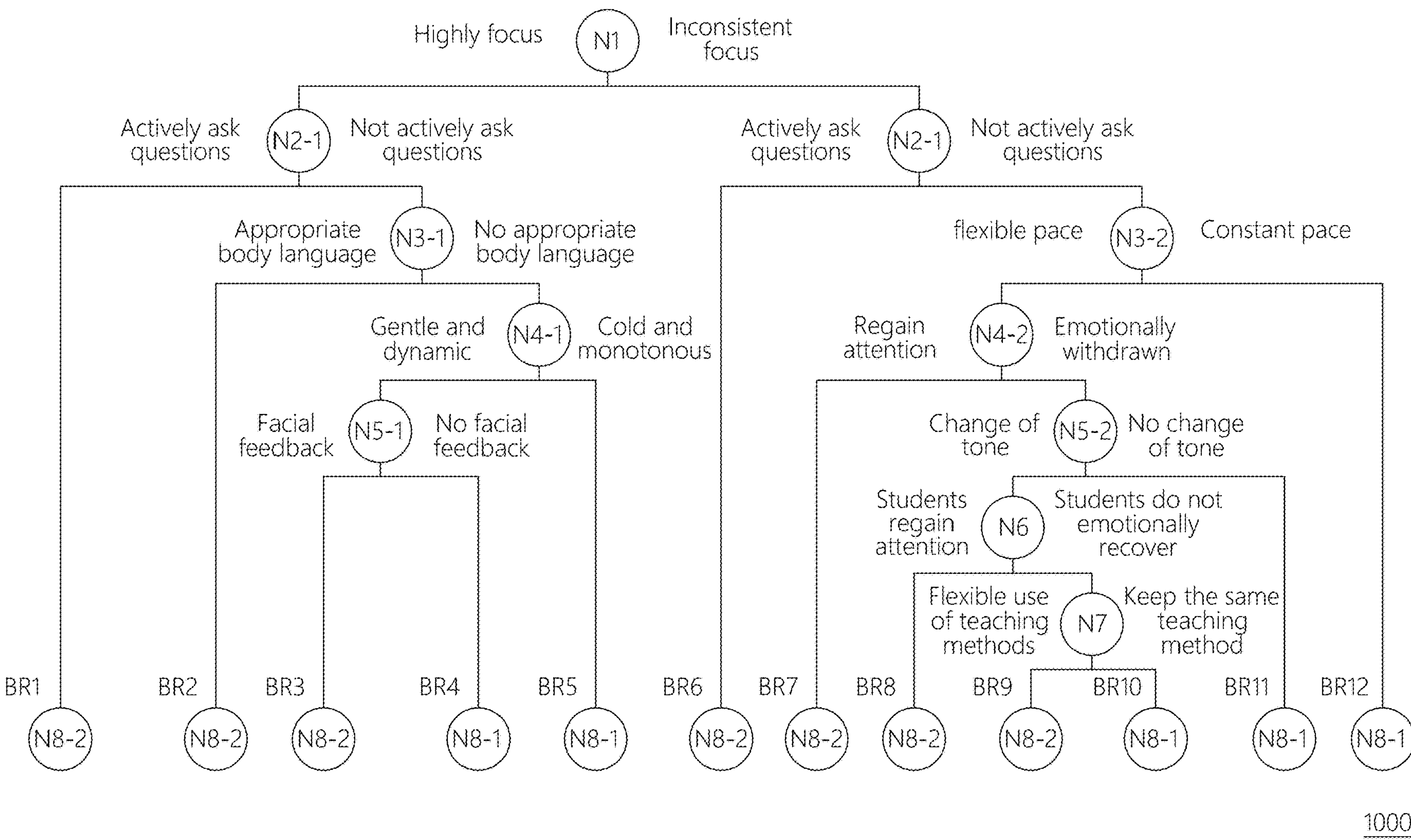
FIG. 10A is a schematic diagram illustrating a decision tree, according to seventh and eighth non-limiting examples.
Figure 10B:
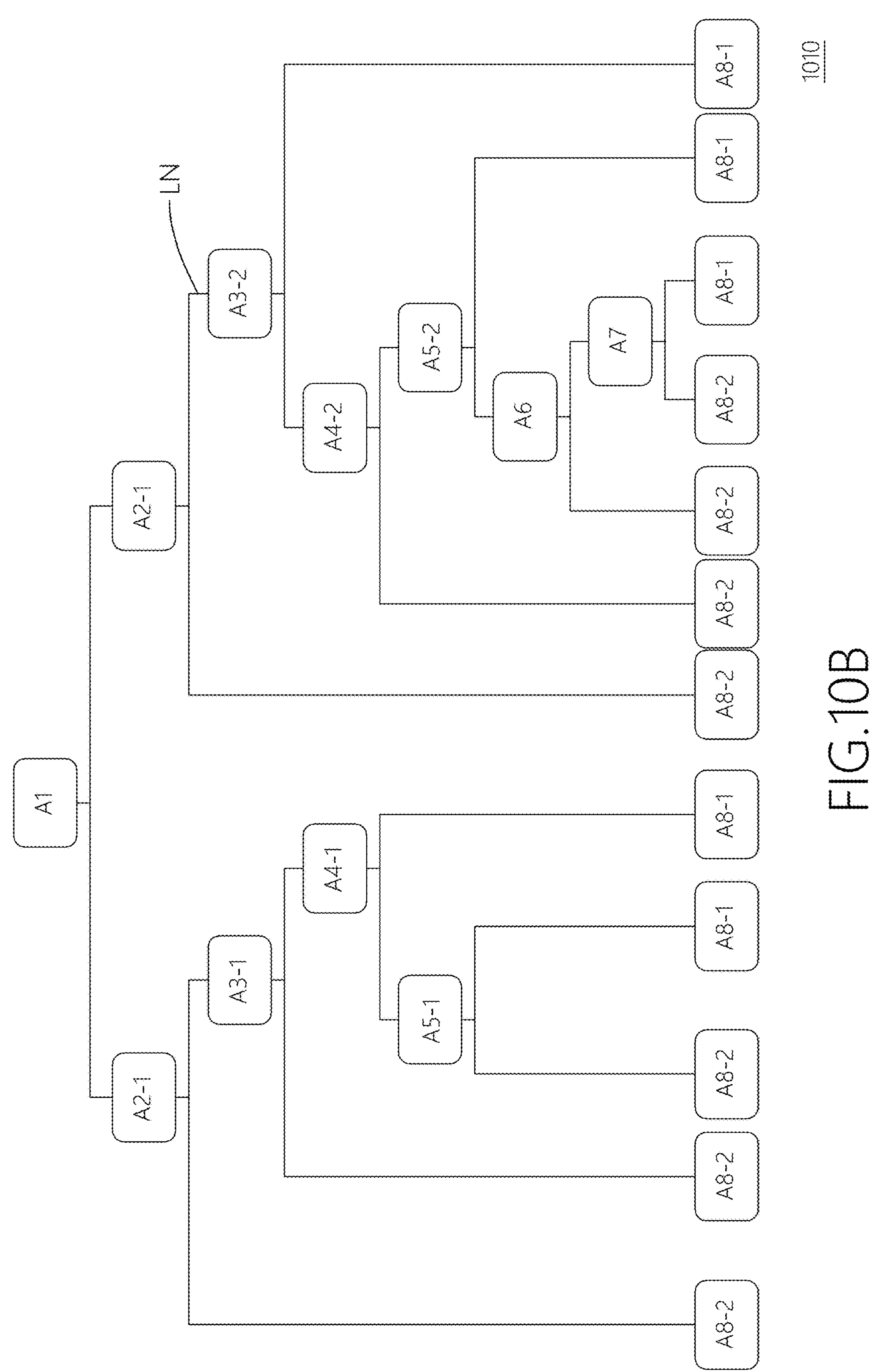
FIG. 10B is a schematic diagram illustrating an interactive multimedia designed based on the decision tree shown in FIG. 10A, according to the seventh and eight non-limiting examples.

FIG. 10A is a schematic diagram illustrating a decision tree 1000, according to seventh and eighth non-limiting examples. FIG. 10B is a schematic diagram illustrating an interactive multimedia 1010 designed based on the decision tree 1000, according to the seventh and eight non-limiting examples.

The decision tree 1000 is generated based on source data designed for analyzing how teachers' performance and students' reaction affect students' learning outcome. The teachers' performance and students' reaction are predictor variables, whereas the students' learning outcomes are indicated by a target variable. By running attribute selection process, these predictor variables are ranked, and those with high importance are selected for a root node N1 and internal nodes N2-1, N2-2, N3-1, N3-2, N4-1, N4-2, N5-1, N5-2, N6, N7 of the decision tree 1000. By passing down the source data, the source data is classified according to splitting rules at the root node N1 and the internal nodes N2-1, N2-2, N3-1, N3-2, N4-1, N4-2, N5-1, N5-2, N6, N7, into homogeneous groups mapped to leaf nodes N8-1, N8-2 indicating low probability of effective learning and high probability of effective learning, respectively. Table 8 summarizes predictor variables corresponding to the root node N1 and the internal nodes N2-1. N2-2. N3-1. N3-2. N4-1. N4-2. N5-1. N5-2. N6. N7. as well as the splitting rules based on the predictor variables.

TABLE 8

| Node | Predictor variable | Splitting rule |
|---|---|---|
| Root node N1 | Students' focused state | Binary split into a subgroup of which students show highly focused state, and a subgroup of which students show inconsistent focus |
| Internal node N2-1 | If students actively ask questions | Binary split into a subgroup of which students actively ask questions, and a subgroup of which students do not actively ask questions |
| Internal node N2-2 | If teachers notice that students are losing focus, and adjust accordingly | Binary split into a subgroup of which teachers do notice and adjust, and a subgroup of which teachers do not notice nor adjust |
| Internal node N3-1 | If teachers use appropriate body language | Binary split into a subgroup of which teachers use appropriate body language, and a subgroup of which teachers do not use appropriate body language |
| Internal node N3-2 | If teachers keep constant pace | Binary split into a subgroup of which teachers keep constant pace, and a subgroup of which teachers flexibly use different paces |
| Internal node N4-1 | Teachers' tone of voice | Binary split into a subgroup of which teachers use gentle and dynamic tone, and a subgroup of which teachers use cold or monotonous tone |
| Internal node N4-2 | Students' reaction to teachers' adjustment | Binary split into a subgroup of which students return attention to class, and a subgroup of which students become emotionally withdrawn |
| Internal node N5-1 | Teachers' facial feedback | Binary split into a subgroup of which teachers provide facial feedback, and a subgroup of which teachers do not provide facial feedback |
| Internal node N5-2 | If teachers change tone of voice while noticing students being withdrawn from class | Binary split into a subgroup of which teachers do adjust tone of voice, and a subgroup of which teachers do not change tone of voice |
| Internal node N6 | If students regain attention when teachers change tone of voice | Binary split into a subgroup of which students regain attention, and a subgroup of which students do not regain attention |
| Internal node N7 | If teachers change teaching method while noticing that students are not regaining attention | Binary split into a subgroup of which teachers flexibly use different teaching methods, and a subgroup of which teachers keep the same teaching method |

As a result of the classification through the nodes, the source data is partitioned into subgroups respectively homogeneous in terms of probability of effective learning. Specifically, subsets of the source data represented by branches BR4, BR5, BR10, BR11, BR12 show low probability of effective learning, which is indicated by leaf nodes N8-1. On the other hand, subsets of the source data represented by branches BR1, BR2, BR3, BR6, BR7, BR8, BR9 show high probability of effective learning, which is indicated by leaf nodes N8-2.

Referring to FIG. 10B, the interactive multimedia 1010 is designed based on the decision tree 1000. Detailed mapping between the interactive multimedia 1010 and the decision tree 1000 is similar to previous non-limiting examples, and would not be repeated again. The interactive activities in the interactive multimedia 1010, which are mapped to the root and internal nodes of the decision tree 1000, may include capturing motions and voices of a teacher and student(s) using motion tracking sensors and recording device(s). The monitoring for these interactive activities may be performed simultaneously. By collecting motion tracking data and recordings for a certain period of time, combination of lines LN leading to one of interactive activities A8-1, A8-2 designed based on the leaf nodes N8-1, N8-2 of the decision tree 1000 can be determined. In this way, probability of effective learning for student(s) can be predicted.

According to the seventh non-limiting example, the interactive multimedia 1010 is used in an A1-assisted educational application for optimizing A1 teachers. Specifically, based on interactions between an A1 teacher and student(s) taught by the A1 teacher, the interactive multimedia 1010 predicts probability of effective learning for the student(s). If the result indicates low probability of effective learning, the corresponding interactive activity A8-1 may provide instruction to improve teaching strategies of the AI teacher, based on the decision tree 1000. For instance, if the student(s) are highly focused but seldom participate actively, and the AI teacher seldom uses appropriate body language and keeps cold and monotonous tone of voice, the interactive multimedia 1010 proceeds to one of the interactive activities A8-1 corresponding to the lead node N8-1 connected to the branch BR5. In this case, the interactive activity A8-1 may provide instruction to increase body language and flexibility of tone of voice to the AI teacher. According to these improvements, the probability of learning effectiveness for the student(s) and teaching effectiveness of the AI teacher may both improve.

According to the eighth non-limiting example, the interactive multimedia 1010 is designed for human teachers. Specifically, a teacher as a user may learn predicted probability of effective learning of his/her student(s) by using the interactive multimedia 1010. As an option, the interactive multimedia 1010 may be used during a class. If the interactive multimedia 1010 proceeds to one of the interactive activities A8-1 mapped to one of the leaf nodes N8-1 indicating low probability of learning effectiveness, the interactive activity A8-1 may present warning during class or provide a report after class, and may further provide suggestion during or after class based on the decision tree 1000. This helps teachers to choose high impact teaching strategies and avoid from using those associated with low learning effectiveness. As a further application, the interactive multimedia 1010 may be integrated in or linked to a teaching platform, and may provide a performance report of the teacher for instructional quality review and long term improvement.

As above, the interactive multimedia provided according to various embodiments of the present disclosure is able to make reliable predictions by interacting with the user, since the interactive multimedia is designed based on a machine learning generated decision tree, which is data-driven and capable of capturing non-linear relationship between complicated predictor variables and a target variable. Owing to the powerful prediction performance, the interactive multimedia can be used in a wide variety of applications, to provide reliable diagnosis and/or analysis for users. In certain applications, the interactive multimedia further provides immersive experience for users to experience the outcomes, which may provide strong impression such that the users may be motivated to adjust their decision making in virtual reality and even in real lives. In some applications, the interactive multimedia even provides recommendations or plans based on the decision tree for the users to improved their outcomes. Thereby, the interactive multimedia may be educational and/or therapeutic.

The foregoing description of embodiments is provided to enable any person skilled in the art to make and use the subject matter. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. A non-transitory computer-readable medium having stored thereon a set of instructions that are executable by a processor of a computer system to carry out an interactive multimedia with multiple levels, to enable interactions with a user, wherein the interactive multimedia comprises:

a first level program, providing at least one first level interactive activity to determine one of multiple lines for the user to proceed from a first level to a next level; and a second level program, providing at least one second level interactive activity to determine one of multiple lines for the user to proceed to from a second level to a next level, wherein the levels and the lines of the interactive multimedia are designed based on a decision tree generated by steps of:

preprocessing a source data, which comprises handling missing data;

running a decision tree algorithm on the source data, which includes predictor variables indicating attributes of respondents and a target variable indicating related outcomes of the respondents, to generate the decision tree;

evaluating the decision tree generated by the decision tree algorithm with one or more predetermined criteria; and in response to the decision tree not satisfying the one or more predetermined criteria, modifying the decision tree and re-evaluating the refined decision tree until the one or more predetermined criteria are satisfied.

2. The non-transitory computer-readable medium according to claim 1, wherein the respondents are individuals in a sample population.

3. The non-transitory computer-readable medium according to claim 1, wherein the respondents are targeted entities.

4. The non-transitory computer-readable medium according to claim 1, wherein the lines correspond to branches of the decision tree, and the interactive activities correspond to nodes of the decision tree.

5. The non-transitory computer-readable medium according to claim 4, wherein one of the lines from each interactive activity is determined according to a splitting rule at the corresponding node of the decision tree.

6. The non-transitory computer-readable medium according to claim 1, wherein an (N-1)th level program of the interactive multimedia provides at least one (N-1)th level interactive activity to determine one of multiple lines for the user to proceed to an Nth level program, which provides Nth level interactive activities for presenting the outcomes.

7. The non-transitory computer-readable medium according to claim 6, wherein each of the Nth level interactive activities further provide analysis based on the decision tree for explaining cause of the one of the outcomes.

8. The non-transitory computer-readable medium according to claim 6, wherein at least one of the Nth level interactive activities further provides a plan for the user based on the decision tree, to guide the user for going through a different combination of the lines leading to another one of the outcomes.

9. The non-transitory computer-readable medium according to claim 8, wherein the plan provided by the at least one of the Nth level interactive activities comprises interactions with the user, and is adjustable according to reactions provided by the user.

10. The non-transitory computer-readable medium according to claim 1, wherein the interactive activities respectively comprise conducting a conversation with the user, and/or respectively comprise presenting an event to the user and sensing reaction of the user in response to the event.

11. The non-transitory computer-readable medium according to claim 1, wherein the interactive activities respectively comprise tracking static and/or dynamic postures of the user.

12. The non-transitory computer-readable medium according to claim 1, wherein the interactive activities respectively comprise tracking and/or recording interactions between the user and at least one another.

13. The non-transitory computer-readable medium according to claim 1, wherein the modifying the at least one decision tree comprises modifying or pruning the at least one decision tree based on feature importance and/or variance of inflation factor (VIF) of the predictor variables.

14. The non-transitory computer-readable medium according to claim 1, wherein generating the decision tree further comprises performing a preliminary evaluation on the source data, based on feature importance and/or VIF.

15. The non-transitory computer-readable medium according to claim 1, wherein the interactive multimedia is designed and generated partially based on hierarchical tree structures of the decision tree.

16. The non-transitory computer-readable medium according to claim 1, wherein the interactive multimedia is designed and generated based on combination of multiple hierarchical tree structures of the decision trees.

17. A computer implemented method for designing an interactive multimedia, comprising:

generating a decision tree based on a source data by using a machine learning technique, wherein the decision tree has a hierarchical tree structure with multiple layers connected with one another by multiple branches; and generating user interface of the interactive multimedia, wherein the user interface has multiple levels corresponding to the multiple layers of the decision tree, and adjacent levels are connected via multiple lines corresponding to the multiple branches of the decision tree, respectively;

wherein the generating the decision tree comprises:

preprocessing the source data, which comprises handling missing data;

running a decision tree algorithm on the source data including predictor variables indicating attributes of respondents and a target variable indicating related outcomes of the respondents to generate the decision tree;

evaluating the decision tree generated by the decision tree algorithm with one or more predetermined criteria; and in response to the decision tree not satisfying the one or more predetermined criteria, modifying the decision tree and re-evaluating the refined decision tree until the one or more predetermined criteria are satisfied.

18. The computer implemented method according to claim 17, wherein the interactive multimedia is designed and generated partially based on hierarchical tree structures of the decision tree.

19. The computer implemented method according to claim 18, wherein the respondents are individuals in a sample population, or targeted entities.

20. The computer implemented method according to claim 18, wherein the layers of the decision tree respectively have at least one node from which at least two of the branches branch out, and each level of the user interface provides at least one interactive activity for a user based on the at least one node in one of the layers of the decision tree.

21. The computer implemented method according to claim 20, wherein the nodes of the decision tree include a root node and multiple internal nodes selected from the predictor variables in the source data.

22. The computer implemented method according to claim 20, wherein each interactive activity at one of the levels of the user interface is provided for acquiring an attribute of the user, which is corresponding to one of the predictor variables in the source data.

23. The computer implemented method according to claim 20, wherein a bottom layer of the decision tree has multiple ones of the node indicating the related outcomes of the respondents, and a bottom level of the user interface provides multiple ones of the interactive activity for presenting the related outcomes.

24. The computer implemented method according to claim 23, wherein the bottom level of the user interface further provides analysis based on the decision tree for explaining causes resulting the outcomes.

25. The computer implemented method according to claim 23, wherein the bottom level of the user interface further provides a plan to guide the user to another one of the outcomes.

26. The computer implemented method according to claim 18, wherein the modifying the decision tree comprises modifying or pruning the decision tree based on feature importance and/or variance of inflation factor (VIF) of the predictor variables.

27. The computer implemented method according to claim 18, wherein generating the decision tree further comprises performing a preliminary evaluation on the source data, based on feature importance and/or VIF.

28. The computer implemented method according to claim 18, wherein the interactive multimedia is designed and generated based on combination of multiple hierarchical tree structures of the decision trees.

29. A non-transitory computer-readable medium having stored thereon a set of instructions that are executable by a processor of a computer system to carry out an interactive multimedia with multiple levels; to execute computer program instructions to enable interactions with a user, and comprising:

a top level program, providing at least one top level interactive activity to determine a specific one of multiple lines for the user to proceed from a top level to a next level; and at least one internal level program, providing at least one internal level interactive activity for each internal level to determine one of multiple lines for the user to proceed from the first internal level directly or indirectly to a bottom level, wherein the top level interactive activity, the at least one internal level interactive activity and the bottom level interactive activity of the interactive multimedia are designed respectively based on a root node of a top layer, an internal node of a first internal layer, and a leaf node of a bottom layer of a decision tree generated by a machine learning technique with steps of:

preprocessing a source data, which comprises handling missing data;

running a decision tree algorithm on the source data including predictor variables indicating attributes of respondents and a target variable indicating related outcomes of the respondents to generate the decision tree;

evaluating the decision tree generated by the decision tree algorithm with one or more predetermined criteria; and in response to the decision tree not satisfying the one or more predetermined criteria, modifying the decision tree and re-evaluating the refined decision tree until the one or more predetermined criteria are satisfied.

30. The non-transitory computer-readable medium according to claim 29, wherein (1) the at least one internal level of the interactive multimedia has multiple internal levels including the first internal level and a last internal level, (2) at least one internal level interactive activity for each internal level determines one of multiple lines for the user to procced from the first internal level directly or indirectly to the last internal level, and (3) the last internal level interactive activity of the interactive multimedia is designed based on an internal node of the last internal layer of the decision tree.

31. The non-transitory computer-readable medium according to claim 29, wherein (1) the at least one internal level of the interactive multimedia has at least three internal levels including the first internal level, a second internal level, and a last internal level, (2) at least one internal level interactive activity for each internal level is provided to determine one of multiple lines for the user to procced from the first internal level to the second internal level and then directly or indirectly to the last internal level, and (3) the second internal level interactive activity and the last internal level interactive activity of the interactive multimedia are designed respectively based on an internal node of the second internal layer and an internal node of the last internal layer of the decision tree.

32. A computer implemented method for designing an interactive multimedia, comprising:

generating a decision tree based on a source data by using a machine learning technique, wherein the decision tree has a hierarchical tree structure with multiple layers connected with one another by multiple branches; and generating user interface of the interactive multimedia, wherein the user interface has a top level, at least one internal level, and a bottom level, and provides at least one interactive activity at each level to determine one of multiple lines to proceed from a top level, to a first internal level, and directly or indirectly to a bottom level;

wherein proceeding from the top level, to the first internal level, and directly or indirectly to the bottom level of the user interface corresponds to a path from a root node of a top layer, to a first internal node of a first internal layer, and directly or indirectly to a leaf node of a bottom layer of the decision tree, respectively; and wherein generating the decision tree comprises:

preprocessing the source data, which comprises handling missing data;

running a decision tree algorithm on the source data including predictor variables indicating attributes of respondents and a target variable indicating related outcomes of the respondents to generate the decision tree;

evaluating the decision tree generated by the decision tree algorithm with one or more predetermined criteria; and in response to the decision tree not satisfying the one or more predetermined criteria, modifying the decision tree and re-evaluating the refined decision tree until the one or more predetermined criteria are satisfied.

33. The computer implemented method according to claim 32, wherein (1) the at least one internal level of the user interface has multiple internal levels including the first internal level and a last internal level, (2) the user interface provides at least one internal level interactive activity for each internal level to determine one of multiple lines to procced from the first internal level directly or indirectly to the last internal level, and (3) the last internal level of the user interface is designed based on an internal node of the last internal layer of the decision tree.

* * * * *